United States Patent [19]

Bevins, Jr et al.

[11] Patent Number: 5,060,262
[45] Date of Patent: Oct. 22, 1991

[54] VIDEO SCRAMBLING, AUDIO MASKING AND DATA TRANSMISSION METHODS FOR WIRELESS CABLE SYSTEMS

[76] Inventors: George L. Bevins, Jr, 3524 Godwin Blvd., Suffolk, Va. 23434; Patrick G. Griffin, 2424 Locks Landing, Chesapeake, Va. 23323; Phillip K. Kendall, 710 Summers Pl., Portsmith, Va. 23702; John J. Hayes, 1013 Kincaid Ter., Chesapeake, Va. 23320

[21] Appl. No.: 519,856

[22] Filed: May 7, 1990

[51] Int. Cl.⁵ .......................... H04N 7/167
[52] U.S. Cl. ........................ 380/19; 380/6; 380/10; 380/12; 380/15; 380/17; 380/20
[58] Field of Search ............. 380/7, 10, 12, 15, 17, 380/19, 20, 6

[56] References Cited

U.S. PATENT DOCUMENTS 4,706,284 11/1987 Citta et al. ..................... 380/12
4,802,213 1/1989 Citta et al. ..................... 380/7

Primary Examiner—Bernarr E. Gregory

[57] ABSTRACT

Video scrambling is accomplished by attenuating the video carrier during the horizontal blanking interval and/or by omitting horizontal sync pulses, vertical serration pulses and equalizing pulses. The method of scrambling can be dynamically changed, but this is done only at the change of scenes. Audio masking and data transmission is accomplished via phase modulation of the video carrier. At the receiver, timing signals for unscrambling video and unmasking audio are obtained from the transmitted data. The system addresses problems that exist in wireless cable systems, but are not present in cabled systems.

40 Claims, 15 Drawing Sheets

WAVEFORM A: NORMAL VERTICAL SYNC INTERVAL

WAVEFORM B: MODIFIED VERTICAL SYNC INTERVAL

WAVEFORM C: MODIFIED VERTICAL SYNC INTERVAL

VIDEO SCRAMBLING, AUDIO MASKING AND DATA TRANSMISSION METHODS FOR WIRELESS CABLE SYSTEMS

BACKGROUND OF THE INVENTION

1. Field of the Invention

The present invention generally relates to signal transmission and receiving means for use in a wireless cable pay television system and, more particularly to a system which conveys addressing data to one-way addressable set top converters, scrambles/unscrambles video signals, masks/unmasks audio signals and provides additional data paths per channel. Wireless cable systems provide pay television services by broadcasting television signals over the air using microwave transmitters, whereas classical cable TV systems use coax cable to distribute signals.

2. Description of the Prior Art

Cable television has become very popular in the United States, and the operation of cable systems has become quite profitable. These systems use coaxial cable and amplifiers to distribute television signals, data and, in some cases, FM radio signals to subscribers. Through the years, equipments used in cable television for generating, receiving and processing signals have become very sophisticated and cost effective. Modern systems provide some or all of the following capabilities at low cost:

1. Sophisticated baseband or RF video scrambling. Several modes of scrambling are often provided.
2. Audio masking or scrambling.
3. One or two-way addressable converters, with data rates up to 15 kbits/second.
4. Many subscriber features, such as remote control, parental control and delivery of programs on a pay per view basis.

In recent years, an alternative means for delivering "cable TV" programming to subscribers has become available through actions taken by the Federal Communications Commission (FCC). Up to thirty-three channels are now available for over-the-air transmission of television signals in the frequency ranges of 2,150 to 2,162 MHz, and 2,500 to 2,690 MHz. These frequencies are licensed by the Multi-point Distribution Service (MDS), Instructional Television Fixed Service (ITFS), Multi-point, Multi-channel Distribution Service (MMDS) and Operational Fixed Service (OFS). FIG. 1 illustrates the microwave frequencies available from these FCC bureaus.

The delivery of pay TV programming using microwave transmission has become associated with the name "Wireless Cable", since "cable" programming is delivered using a "wireless" transmission method. Equipments used in wireless cable systems must perform most, if not all, of the functions performed by cable equipment. However, wireless cable systems impose technical problems that do not exist for cable systems. Thus, video scrambling methods and data transmission methods which are more than adequate for cable systems may be totally unacceptable in a wireless cable environment.

The basic elements of a wireless cable system are illustrated in FIG. 2. At the transmitter site 10, video/audio signals (from satellite, tape or other source) are applied to a modulator 12 and then to a microwave transmitter 14. Data from an addressing computer 16 is applied to a modulator 13 and then to a microwave transmitter 15. The outputs of the transmitters 14 and 15 are combined in a channel combiner 18 and applied to a transmitting antenna 19 using waveguide.

Per current FCC regulations, signals are broadcast to receive sites at power levels of 10, 50 or 100 watts per channel. The output signals from modulators 12 and 13 are conveyed to converters (not shown) so that the modulated signals are within the spectrum allocated for the channel. Additionally, if scrambling is performed, it is assumed that the modulator also performs all scrambling functions.

Each receive site 20 consists of a receiving antenna 21, block down converter 22, set top converter 23, and TV receiver 24. The block down converter 22 is mounted close to the receiving antenna 21 and converts all of the microwave channels to the VHF frequency band. At these lower frequencies, the channels can be cabled into the home using standard coax with little signal loss. Channels are selected using the set top converter 23. The converter 23 typically provides a channel 2, 3 or 4 output to the TV receiver 24. If one or more channels are scrambled, the converter contains the appropriate descrambling circuitry.

A wireless cable system is different from a typical cable system in many respects. Some of these differences present significant technical challenges to designers of wireless cable systems, particularly in the areas of scrambling and data delivery. Some specific problems which are unique to wireless cable systems are described below:

1. Transmitter Non-Linearity: In cable systems, the output of the modulator for each channel is applied to an up converter. The up converter's output is at a low power level, and therefore the up converter can be very linear. In wireless cable systems, the transmitter must provide 10, 50 or 100 watts. As a result, even the best transmitters available today are not as linear as cable up converters. This transmitter non-linearity can cause problems when typical sync suppression or sync offset scrambling systems are used. Specifically, in any video scrambling system which attenuates or offsets selected sync pulses, while keeping the unselected pulses unaltered, transmitter non-linearity usually results in streaking in the descrambled picture. Streaking occurs because the attenuated (or offset) sync pulses require less power output from the transmitter as compared to a standard sync pulse. The non-linear characteristic of the transmitter results in a "crushing", or reduction, of unsuppressed sync pulses as compared to the suppressed sync pulses. In the descrambled signal, the amplitude of the sync pulses transmitted in a suppressed, or offset manner is different from those pulses sent normally. Since TV receivers typically use sync amplitude to establish black level, a streaking phenomenon occurs due the variation in sync pulse amplitude.

2. Transmitter Automatic Level Control (ALC): Modern microwave transmitters contain circuitry which automatically controls the power output level. These circuits typically use a peak detector to sense the maximum level of the incoming video intermediate frequency (IF) signal. Transmitter output is set to the desired level (10, 50 or 100 watts) corresponding to the peak video IF level sensed. A similar requirement does not exist for cable systems. Some scrambling systems suitable for cable are not compatible with microwave transmitter ALC circuit operation.

3. Multi-path: Multi-path conditions are virtually non-existent in cable systems. In wireless cable, multi-path conditions can occur frequently. Multi-path conditions can be very disruptive to amplitude modulated signals. Since the picture carrier is amplitude modulated, multipath produces ghosts in the received picture. Any data information conveyed using amplitude modulation (such as data sent in the vertical blanking interval) is very susceptible to corruption by multi-path conditions.

4. Signal Strength Variations: In cable systems, the level of signals applied to the set top converter can usually be confined within a 10 dB range, and any variations which may occur do so very slowly. In wireless cable, signal levels can vary over a range of 30 dB or more, and the rate of change can be rapid (300 Hz or greater).

5. Available Spectrum for Data Carriers: In cable systems, that portion of the frequency spectrum just above 108 MHz (which is the top of the FM radio band) is often used for dedicated data carriers. In wireless cable, the FCC has allocated a limited number of channels, and no "spare" spectrum exists for dedicated data carriers. Furthermore, since channel capacity is limited to a maximum of thirty-three channels, it would be too wasteful to dedicate one channel simply for data transmission.

Methods employed for data delivery and scrambling in cable systems are, in many cases, inadequate for use in wireless cable. A need exists for a low-cost transmission/receiving system for wireless cable which can convey data to addressable set-top converters, scramble/descramble video, mask/unmask audio, and be impervious to transmission problems that are unique to wireless cable systems.

SUMMARY OF THE INVENTION

It is therefore an object of the present invention to provide a system which provides video scrambling, audio masking and multiple data paths for a wireless cable application.

It is another object of the invention to provide a video scrambling system having multiple modes of scrambling which may be dynamically altered during transmission.

It is a further object of the invention to provide both control and auxiliary data transmission in a television signal.

According to the present invention, video scrambling is accomplished by attenuating the video carrier during the horizontal blanking interval and/or by omitting horizontal sync pulses, vertical serration pulses and equalizing pulses. Audio masking and data transmission is accomplished via phase modulation of the video carrier. At the receiver, timing signals for unscrambling video and unmasking audio are obtained from the transmitted data. The disclosed system addresses problems that exist in wireless cable systems, but are not present in cabled systems.

The invention is a transmission and receiving system expressly created for use in wireless cable systems. Although made expressly for wireless cable systems, the invention can be used in a classical cable system. The disclosed system provides:

1. A means for sending addressing data to addressable set top converters.

2. A means for providing auxiliary data paths per channel.

3. A means for scrambling/descrambling video signals.

4. A means for masking/unmasking audio signals.

The system according to the invention provides a minimum of one data path per channel, which is to be used for controlling the operation of set top converters and for enabling/disabling selected features and channel viewability within converters. This data is referred to as "addressing data". Addressing data is also used by the converter to establish timing signals for video descrambling and audio unmasking. Additional data paths for each channel are also provided, and these data paths can be used for any desired purpose. Data sent on these additional data paths is referred to as "auxiliary" data. Auxiliary data is ignored by the converter.

There are two fundamental methods of data transmission. These are phase change magnitude and phase change polarity. For each of the several data transmission modes contemplated by the invention, either the magnitude or polarity method may be used.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 3:
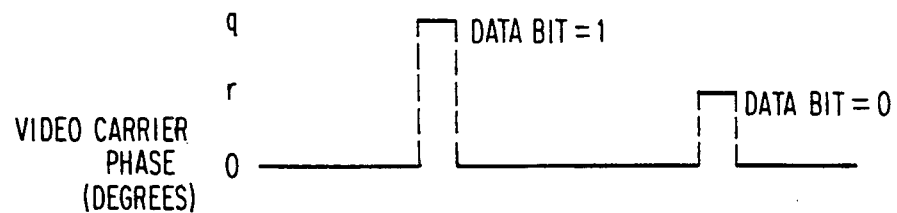
FIG. 3 is a graph illustrating video carrier phase changes used to convey data values.
Figure 4:
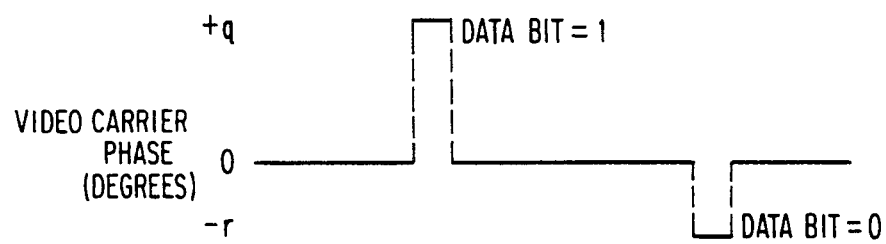
FIG. 4 is a graph illustrating alternate video carrier phase changes used to convey data values.

Data is conveyed using phase modulation of the video carrier. As shown in FIG. 3, a data value equal to a binary "1" is conveyed by changing the phase of the video carrier from a reference phase (0°) to a second phase state (q degrees), and then back to the reference phase. To convey a data value equal to a binary "0", the phase of the video carrier is changed from a reference phase (0°) to a third phase state (r degrees), and then back to the reference phase. An alternative phase modulation scheme is illustrated in FIG. 4 wherein the phase of the carrier is changed from a reference phase (0°) to a second state (+q degrees) and then back to the reference phase to convey the data bit "1" as before. However, to convey the data bit "0" the phase of the video carrier is changed from a reference phase (0°) to a negative phase (−r degrees) and then back to the reference phase. In the scheme shown in FIG. 4, the polarity of the phase change conveys information, while in the scheme shown in FIG. 3, the amplitude of the phase change conveys information.

For all data transmission modes to be described, the time during which the carrier phase is in the second or third phase state is very short (100 to 500 nanoseconds). In the receiver (set top converter 23) the phase change is converted to a pulse using a synchronous detector. For the transmission scheme shown in FIG. 3, the amplitude of the pulse is proportional to the magnitude of the phase change. Thus, the recovered pulse amplitude in the receiver is used to discern if a "0" or "1" was transmitted. For the transmission scheme shown in FIG. 4, the polarity of the pulse depends upon the polarity of the phase change. Thus, the recovered pulse polarity in the receiver is used to discern if a "0" or a "1" was transmitted.

The sections which follow describe specific data transmission modes which utilize the "pulse amplitude" transmission method to provide one or more data paths per channel.

Figure 5:
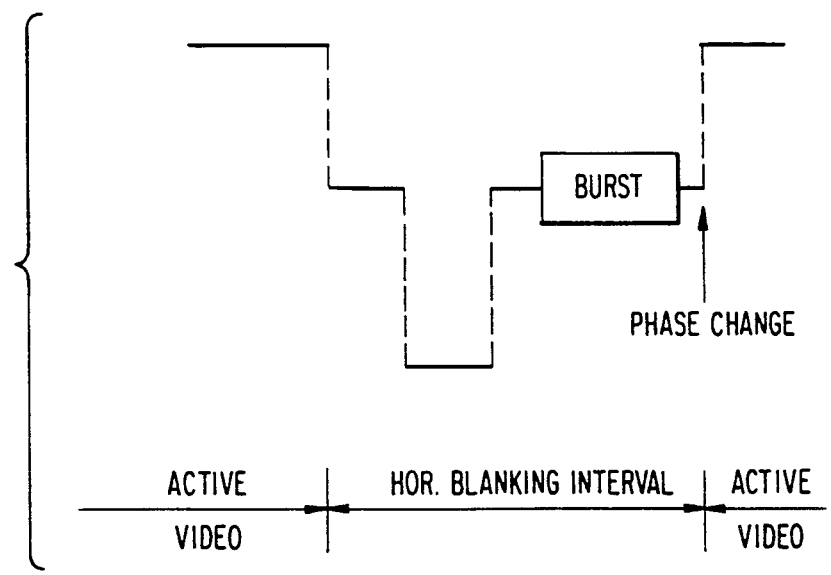
FIG. 5 is a graph showing a phase change occurring within the horizontal blanking interval after color burst to convey one bit per video line.

In data transmission mode 1, one data value is transmitted for each video line. The phase change occurs within the horizontal blanking interval of each video line after color burst. Since data continues to be delivered during the vertical blanking interval, this mode provides a data rate of 15,734 bits per second, assuming a color transmission. FIG. 5 shows the phase change occurring within the horizontal blanking interval after color burst to convey one bit per video line in data transmission mode 1. In the preferred embodiment for mode 1, q=180° and r=0°. This effectively establishes a data delivery system in which the presence of a phase change at the designated position within the video signal constitutes a data value of "1"; the absence of a phase change constitutes a data value of "0".

Figure 6:
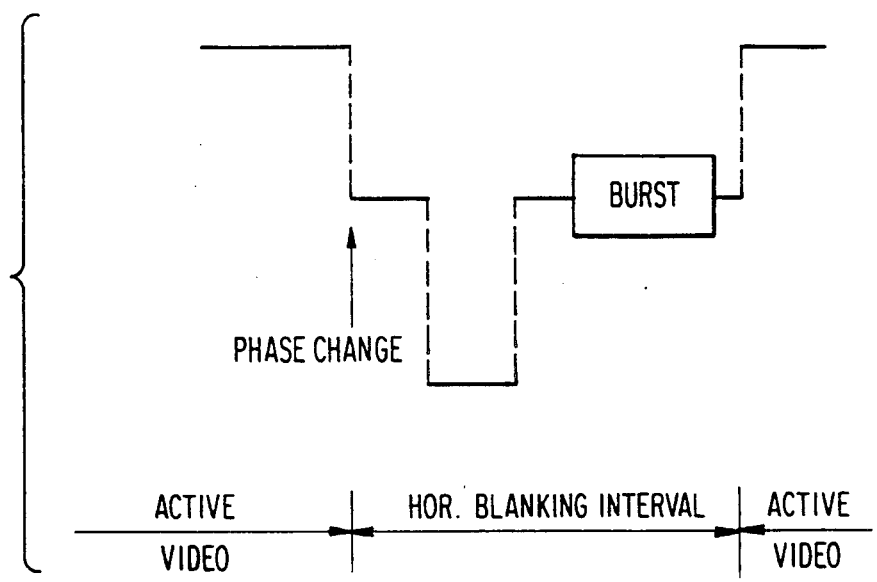
FIG. 6 is a graph showing a phase change occurring within the horizontal blanking interval before color burst to convey one bit per video line.

In data transmission mode 2, one data value is transmitted for each video line as in data transmission mode 1, but the phase change occurs within the horizontal blanking interval of each video line before color burst. Since data continues to be delivered during the vertical blanking interval, this mode provides a data rate of 15,734 bits per second, assuming a color transmission. FIG. 6 shows the phase change occurring within the horizontal blanking interval before the color burst. In the preferred embodiment for mode 2, q=180° and r=0°. This effectively establishes a data delivery system in which the presence of a phase change at the designated position within the video signal constitutes a data value of "1"; the absence of a phase change constitutes a data value of "0".

Figure 7:
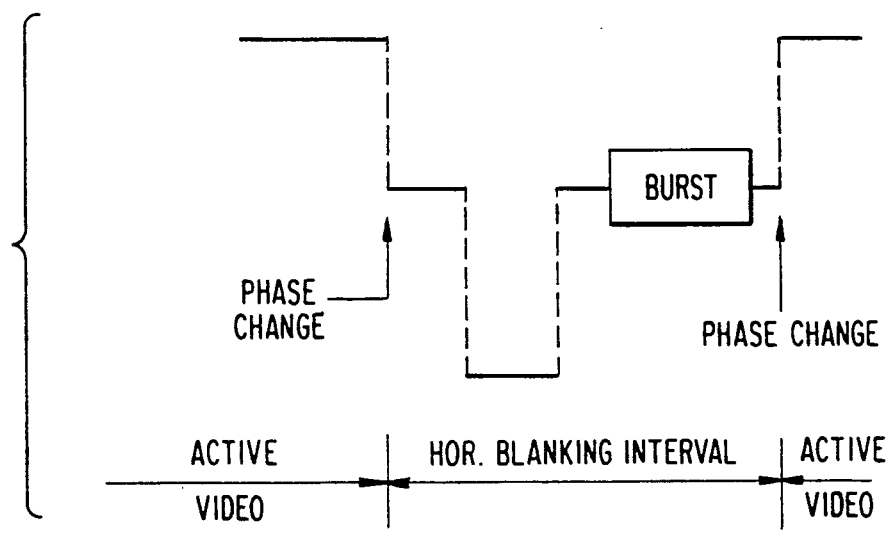
FIG. 7 is a graph showing phase changes occurring within the horizontal blanking interval before and after color burst to convey two bits per video line.

In data transmission mode 3, two data values are transmitted for each video line. The phase change for the first data value occurs within the horizontal blanking interval of each video line after color burst. The phase change for the second data value occurs within the horizontal blanking interval of each video line before color burst. Since data continues to be delivered during the vertical blanking interval, this mode provides two data paths, each having a data rate of 15,734 bits per second, assuming a color transmission. In the preferred embodiment, phase changes are positioned as shown in FIG. 7. In the preferred embodiment for mode 3, q=180° and r=0° for both data paths.

Figure 8:
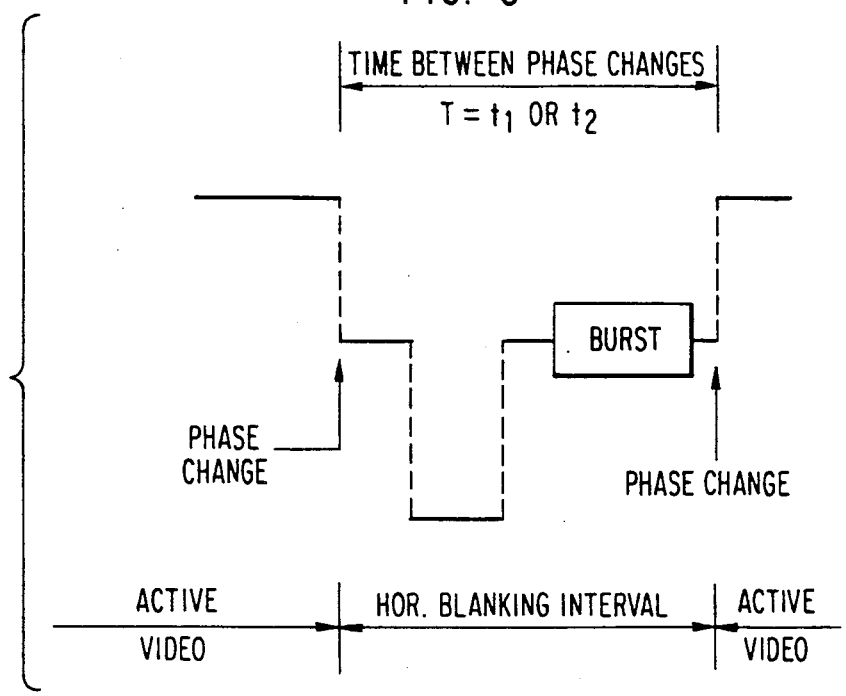
FIG. 8 is a graph showing phase changes occurring within the horizontal blanking interval before and after color burst and the time period between the phase changes varied to convey three bits per video line.

In data transmission mode 4, two phase changes are transmitted for each video line. Both occur within the horizontal blanking interval of each video line. One phase change occurs prior to color burst; the other occurs after color burst. Additionally, the time between each phase change is controlled to be one of two values, thereby providing a third data value per video line. This pattern is maintained through the vertical blanking interval. This mode provides three data paths, each having a data rate of 15,734 bits per second, assuming a color transmission. In the preferred embodiment, phase changes are positioned as shown in FIG. 8. In mode 4, neither q nor r can equal 0°.

For data transmission modes 1 and 2, the single data path is used to convey addressing data to set top converters and no auxiliary data path is provided. In data transmission modes 3 and 4, addressing data is always conveyed using the phase polarity of the first phase change within each horizontal blanking interval; the remaining data path(s) are used for auxiliary data.

As stated previously, the "pulse polarity" data transmission method can be used with transmission modes 1 to 4. In this case, neither q nor r can be 0 in any mode. In the preferred embodiment for the phase polarity method, q=+90° and r=−90°.

Figure 9:
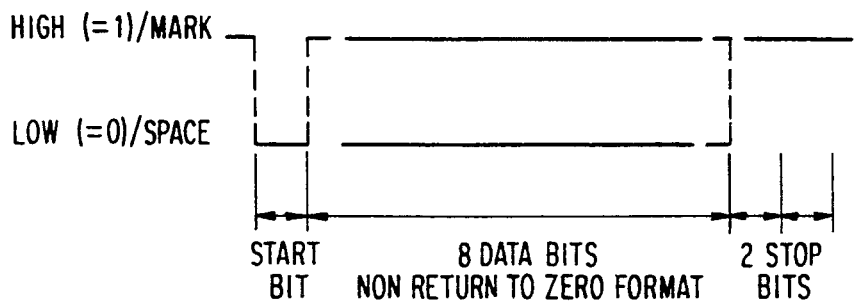
FIG. 9 is a graph showing the data format used for addressing data.

The addressing data protocol is illustrated in FIG. 9 to convey one byte (8 bits of data). Addressing commands consist of a fixed number of bytes. A command is sent simply by transmitting the bytes in sequence. Except as noted below, addressing data is sent continuously. Commands to change the level of service in specific converters is sent as required; when no need exists to change the level of service in a converter, commands are sent to update or refresh current levels of service. No specific protocol or format is imposed for auxiliary data.

Figure 10:
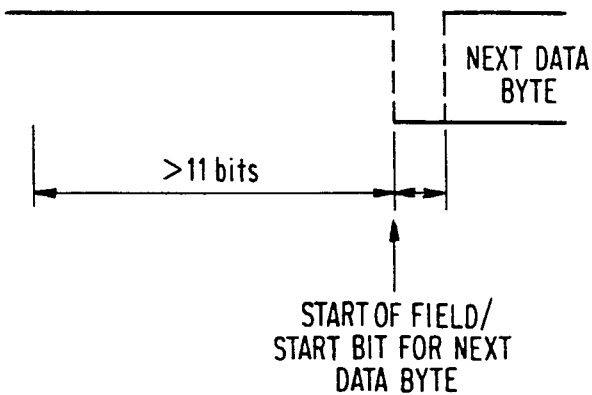
FIG. 10 is a graph showing the protocol for indicating the start of video fields.

Once per field, a portion of the addressing data stream is used to identify the start of a new field of video. This information is required by the converter circuitry to descramble video and unmask audio. Noting that the data protocol shown in FIG. 9 guarantees at least one bit equal to "0" out of every 11 bits transmitted, the start of a new field is indicated by transmitting more than 11 bits equal to 1 (i.e., transmit a mark condition for more than 11 bit times). The next falling edge (i.e., the next "0" bit transmitted) indicates the start of the next field, as well as the start bit for the next byte of data. This is illustrated in FIG. 10. The series of 11 or more "1" bits is inserted into the addressing data stream such that incomplete bytes of addressing data are never sent. Therefore, while the 11 or more "1" bits are sent, the microprocessor in the set top converter 23 simply waits for a "0", or start bit, to be received. The series of "1" bits for field identification may be inserted between bytes within one command and thereby extend the time required to complete the transmission of that command.

For the purposes of video scrambling, the video signal is divided into two portions:

1. Vertical Sync Interval. This interval consists of a first group of six equalizing pulses, six vertical serration pulses and a second group of six equalizing pulses. This interval occupies the first nine lines of each field.

2. Non-Vertical Sync Interval. This interval occupies lines 10 to 262 of each field. On lines 10 to 262 of each field, three scrambling modes can be supported:

1) Normal (no scrambling).

2) Sync Attenuation: The transmitted signal is attenuated during the horizontal blanking interval of each line. When invoked, one level of attenuation is used.

3) Sync Omission: During the horizontal blanking interval of each line, the front porch, sync pulse and back porch are set to an equal level that is greater than 0 IRE. Burst is transmitted, but at reduced amplitude. In the preferred embodiment, 60 IRE is used.

Figure 11A:
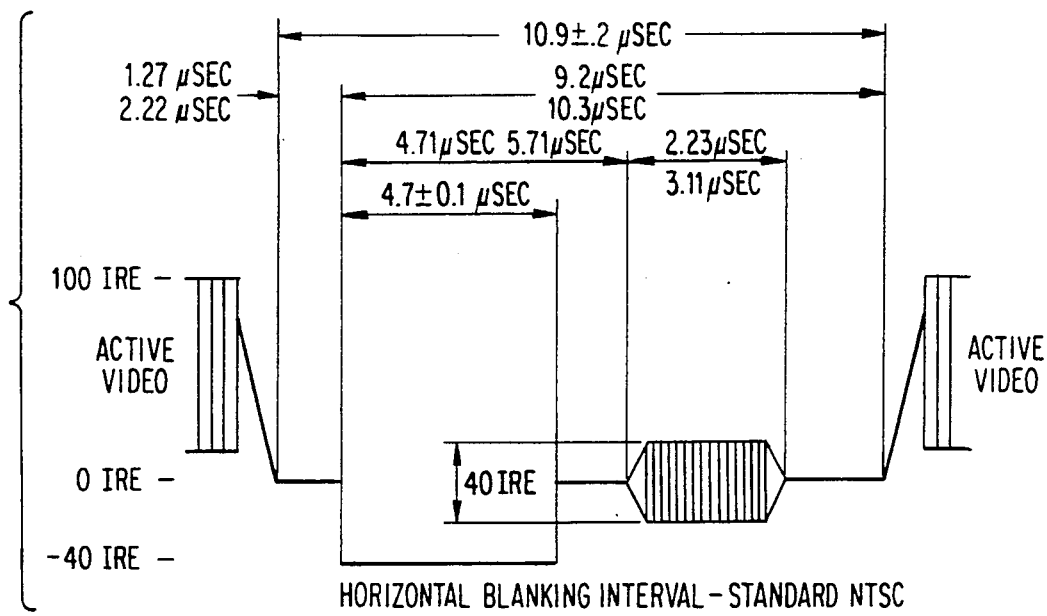
FIG. 11A is a graph of the horizontal blanking interval based on the NTSC standard.
Figure 11B:
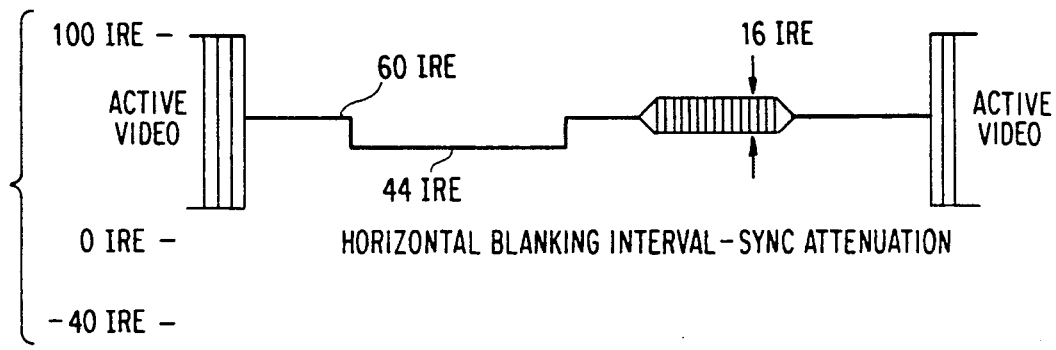
FIG. 11B is a graph of the horizontal blanking interval with sync attenuation.
Figure 11C:
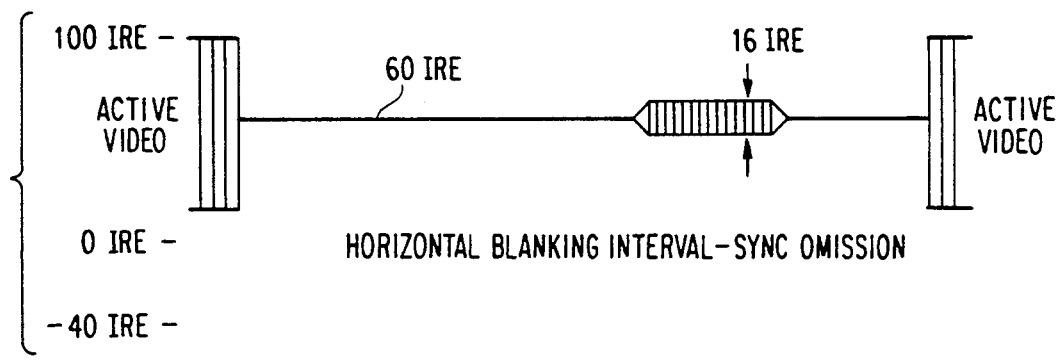
FIG. 11C is a graph of the horizontal blanking interval with sync omission.

FIG. 11A illustrates the horizontal blanking interval of a standard baseband video signal. FIGS. 11B and 11C show, respectively, baseband video signals which illustrate the preferred levels used for sync attenuation and sync omission. Although these scrambling modes are illustrated using the baseband video signal, it is important to note that most of the signal processing is performed on the video IF signal, as explained below.

Figure 12A:
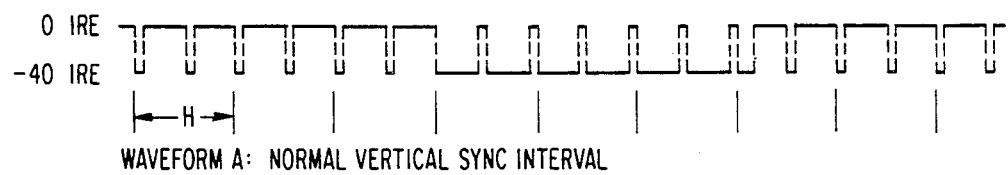
FIG. 12A is a graph showing the normal vertical sync interval.

During the first nine lines of each field (i.e., during the transmission of equalizing pulses and vertical serration pulses), three scrambling modes are supported:

A) Normal: No vertical scrambling occurs; the waveform A shown in FIG. 12A is transmitted.

Figure 12B:
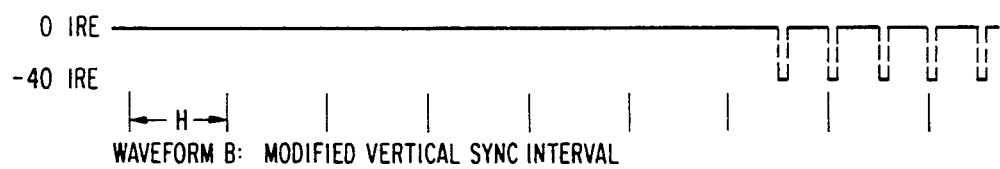
FIG. 12B is a graph showing a first modified vertical sync interval transmitted during the first nine lines of each field.

B) Vertical Serration Pulse Omission: Waveform B shown in FIG. 12B is transmitted.

Figure 12C:
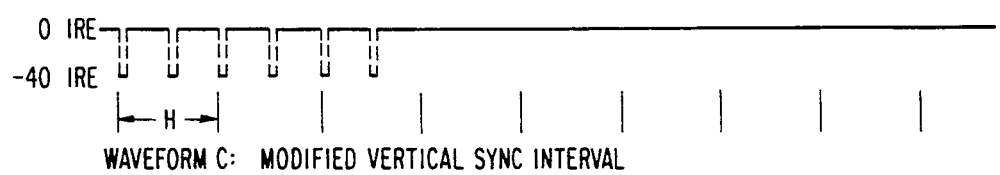
FIG. 12C is a graph showing a second modified vertical sync interval transmitted during the first nine lines of each field.

C) Vertical Serration Pulse Omission: Waveform C shown in FIG. 12C is transmitted.

Scrambling modes A, B and C and 1, 2 and 3 can be changed dynamically, given that the changes occur no faster than a field rate, and that any change occurs during a scene change in the program being viewed. This precludes changes in scrambling modes on a line-to-line basis within one field. Allowable combinations are tabulated below.

| SCRAMBLING MODE | |
|---|---|
| Lines 1 to 9 | Lines 10 to 262 |
| A-No Scrambling | 1-No Scrambling |
| | 2-Sync Attenuation |
| | 3-Sync Omission |
| B-Waveform B | 2-Sync Attenuation |
| | 3-Sync Omission |
| C-Waveform C | 2-Sync Attenuation |
| | 3-Sync Omission |

Audio masking is accomplished by reversing the phase of the picture carrier (180° phase changes) during the first nine lines of each field. The carrier is alternately placed in each of the two phase states across the nine line interval. Each phase state is invoked for a length of time equal to half of a video line, or approximately 31.5 $\mu$sec. If the transmitted audio/video signal is applied directly to a standard television receiver which uses intercarrier sound detection, the phase reversals on the video carrier become impressed on the audio carrier. These phase reversals are detected by the audio detector and are heard as an interfering, 60 Hz tone. Audio is still understandable, but is "masked" by the interfering tone. If the TV receiver uses parallel sound detection, no masking occurs.

The timing of the phase changes imposed on the video IF carrier for audio masking is chosen such that the carrier is in the reference phase state whenever a phase change is transmitted for data delivery.

Figure 13:
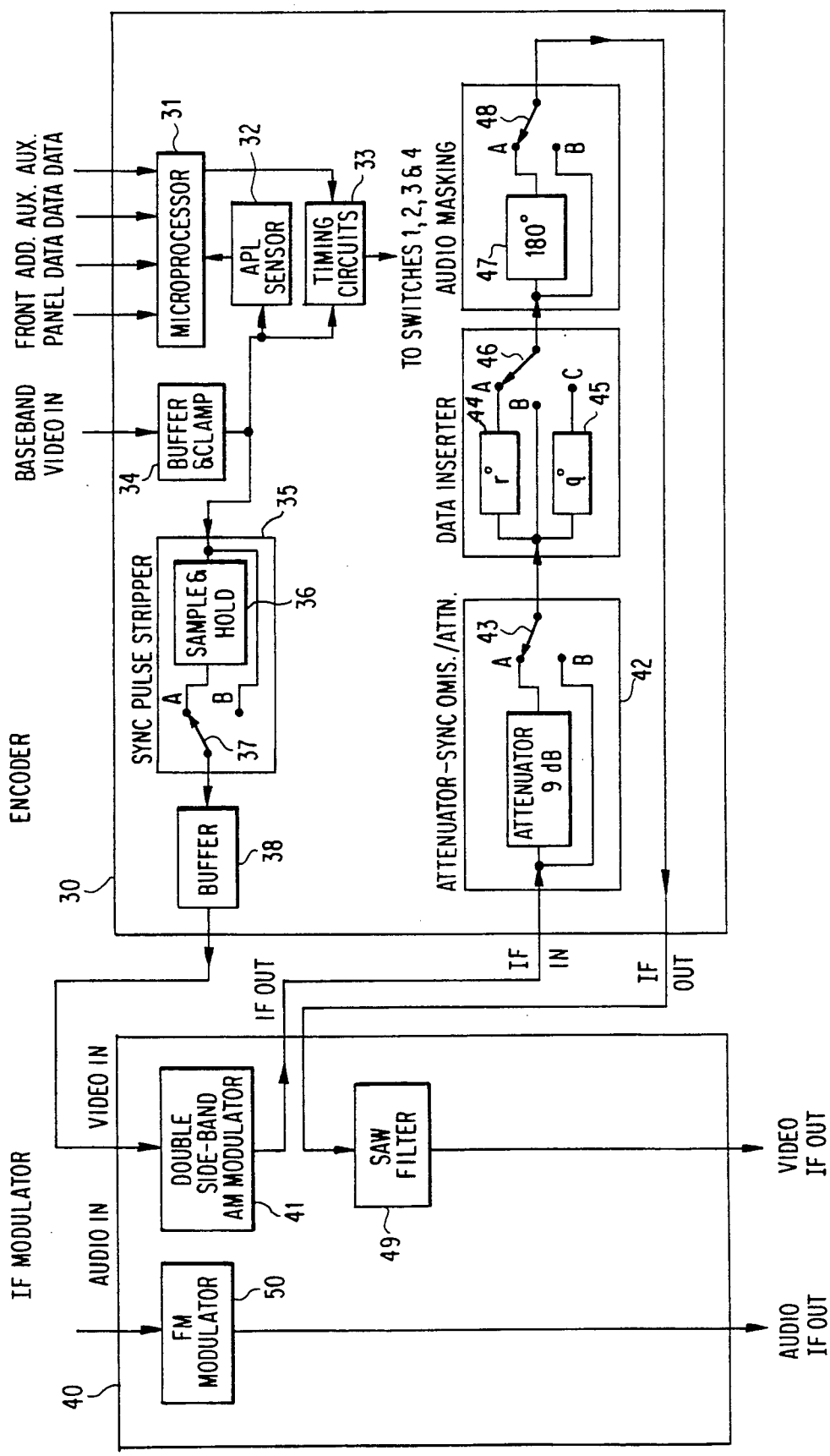
FIG. 13 is a block diagram of the encoder/modulator at the transmitter site.

FIG. 13 is a block diagram of the circuitry required for supporting all modes of video scrambling, data transmission and audio masking. The block diagram shows an encoder 30, which performs all scrambling and data generation functions, separate from the IF modulator 40. In practice, the modulator 40 and encoder 30 can be placed in one enclosure.

The encoder 30 contains a microprocessor 31 which accepts data from an addressing computer and from auxiliary data sources (not shown). The microprocessor 31 also monitors front panel switches, to allow selection of scrambling mode or to prevent selected modes from being invoked, and an output from an Average Picture Level (APL) sensor 32. Control information for encoder operation can be obtained from front panel switches, or be imbedded within the addressing data stream from the addressing computer. Depending upon front panel switch states, or control data from the addressing computer, the encoder 30 will automatically select scrambling modes. Scrambling can be changed dynamically, but changes occur only when a scene change occurs in the program as indicated by the output of the APL sensor 32. Microprocessor outputs are applied to the timing circuits 33 to indicate (1) the selected video scrambling mode, (2) if audio masking is enabled or disabled, and (3) addressing data and auxiliary data to be inserted onto the picture carrier.

Timing signals are generated based upon data received from the microprocessor 31 and are synchronized with the incoming baseband video signal which is buffered and clamped in the buffer and clamp circuit 34. The timing circuits 33 are shown in more detail in FIG. 14, which is described in more detail hereinafter. After being buffered and clamped, the baseband video signal is applied to a sync pulse stripper 35. This circuitry is used to strip horizontal sync pulses if sync omission is invoked. It is also used to strip equalization and vertical serration pulses when required. In operation, the timing circuit 33 controls the sample and hold 36 to take a sample of the video signal just prior to start of a horizontal sync pulse, vertical serration pulse or equalizing pulse. The sampled voltage level is then held by the sample and hold 36 for the duration of the horizontal sync pulse, vertical serration pulse or equalizing pulse. Switch 37, which is normally in the B position, is moved to position A during the time the pulse is present. After the pulse is complete, switch 37 is moved back to the A position, thereby stripping the pulse. If no scrambling is used for lines 1 to 9, and sync omission is not invoked, switch 37 remains in the B position.

The baseband video signal from buffer 38, as modified by the sync pulse stripper 35, is applied to a double sideband amplitude modulation modulator 41. The output of the modulator 41 is a double sideband, IF video signal with a picture carrier frequency of 45.75 MHz. The double sideband IF video signal is then applied to an attenuator 42, here illustrated as part of the encoder 30. If either sync attenuation or sync omission is invoked, switch 43 is in position A during the horizontal blanking interval; otherwise, it is in position B. If neither sync attenuation nor sync omission is invoked, switch 43 remains in position B. A circuit consisting of phase shift networks 44 and 45 and a switch 46 is used to impose phase changes in the video IF carrier for data transmission. A circuit consisting of a 180° phase shift network 47 and a switch 48 is used to impose phase reversals for audio masking. The modified video IF signal from switch 48 is re-applied to the modulator 40 where it is passed through the vestigial sideband filter 49. The filter 49 is preferably a surface acoustic wave (SAW) filter. The video IF signal is applied to the microwave transmitter for broadcast to receive sites. An FM modulator 50 is used to modulate the baseband audio signal to form the audio IF carrier. The signal processing for audio is identical to that used for a standard NTSC broadcast.

Figure 14:
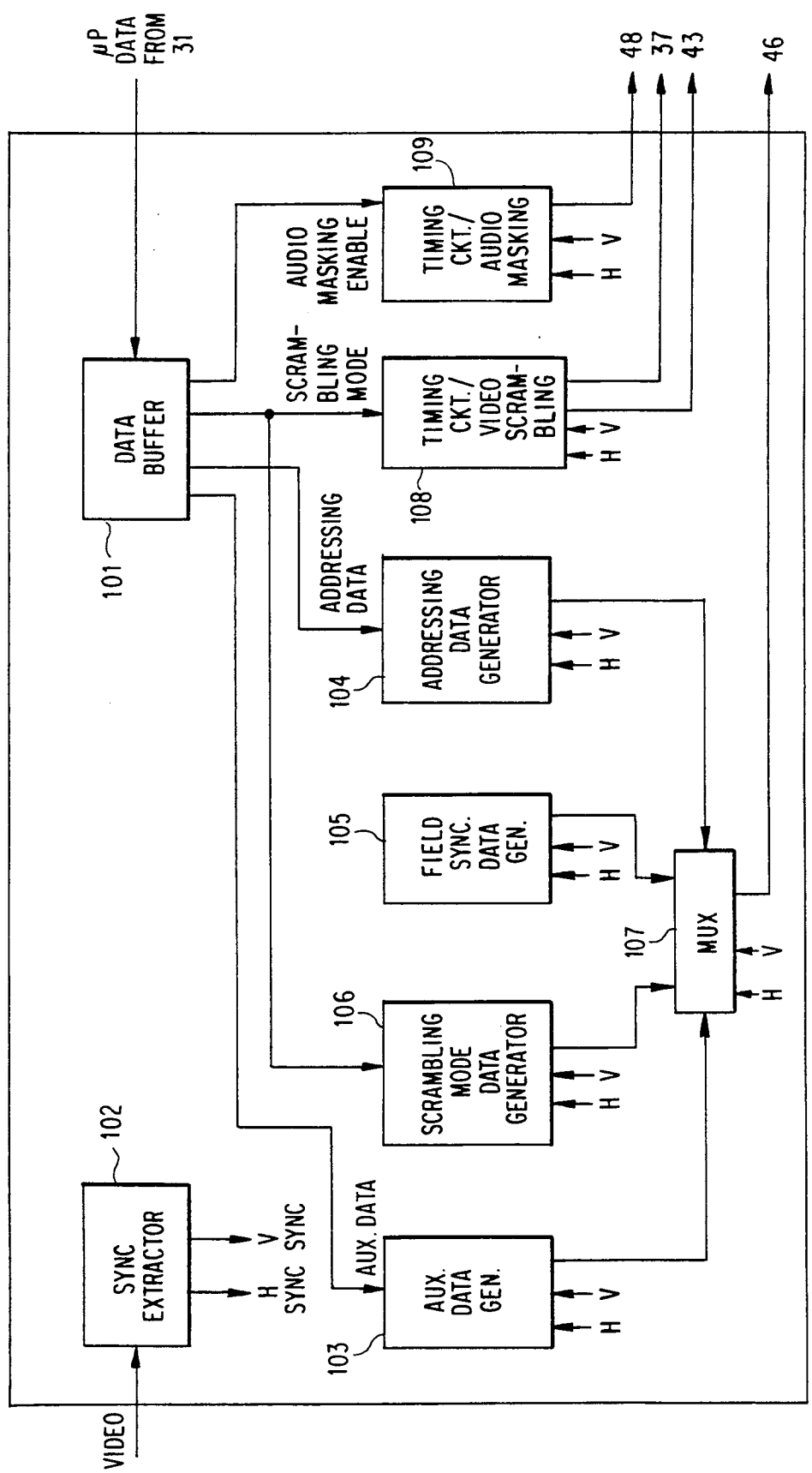
FIG. 14 is a block diagram of the timing circuits for the encoder/modulator shown in FIG. 13.

Referring now to FIG. 14, the timing circuits 33 include a data buffer 101 which stores data received from the microprocessor 31. This data defines the selected video scrambling mode, audio masking status (on or off), addressing data and auxiliary data. Horizontal and vertical sync signals are derived from the baseband video signal using a sync extractor 102. Data to be conveyed on the video carrier using phase changes is derived from four circuits: auxiliary data generator 103, addressing data generator 104, field sync data generator 105, and scrambling mode data generator 106. A multiplexer 107 combines these data to control switch 46. Two additional circuits 108 and 109 provide control signals for video scrambling and audio masking, respectively. The video scrambling circuit generates the signals to control switches 37 and 43, while the audio masking circuit generates the signal to control switch 48. Each of these timing circuits, except the sync extractor 102, are implemented with programmable logic devices (PLDs). The sync extractor 102 may be a commercially available integrated circuit (IC) such as an LM1881M manufactured by National Semiconductor.

Figure 15:
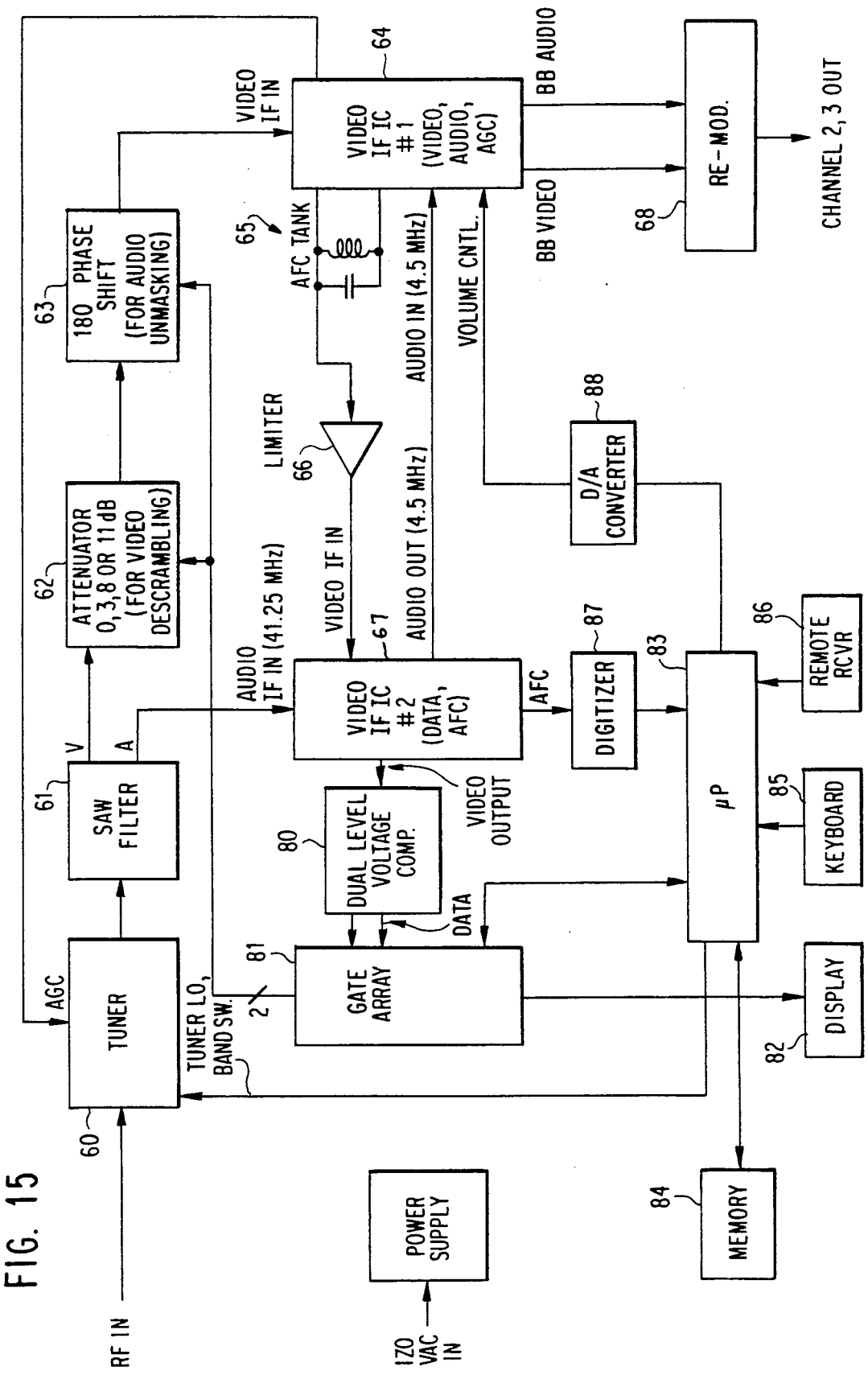
FIG. 15 is a block diagram of the set top converter at a receive site.

After block down-conversion of the received microwave signals, all signal processing is performed by the in-home, set top converter. FIG. 15 is a block diagram of the preferred embodiment of a set top converter. As shown in FIG. 15, the RF input is supplied to a microprocessor controlled tuner 60 of conventional design which produces an IF output signal. This IF signal is separated into video and audio IF portions by the SAW filter 61. The video portion is passed to variable attenuator 62 for video descrambling. To that end the attenuation of the attenuator 62 can be set to 0, 3, 8, or 11 dB attenuation levels. The output of attenuator 62 is then passed to 180° phase shifter 63 for audio unmasking. The output of the phase shifter 63 is then supplied to the video IF input of integrated circuit (IC) 64 which is used to obtain a baseband video signal. This IC uses a pseudo-synchronous detector to detect video and may be a KA2919 IC made by Samsung.

Figure 16:
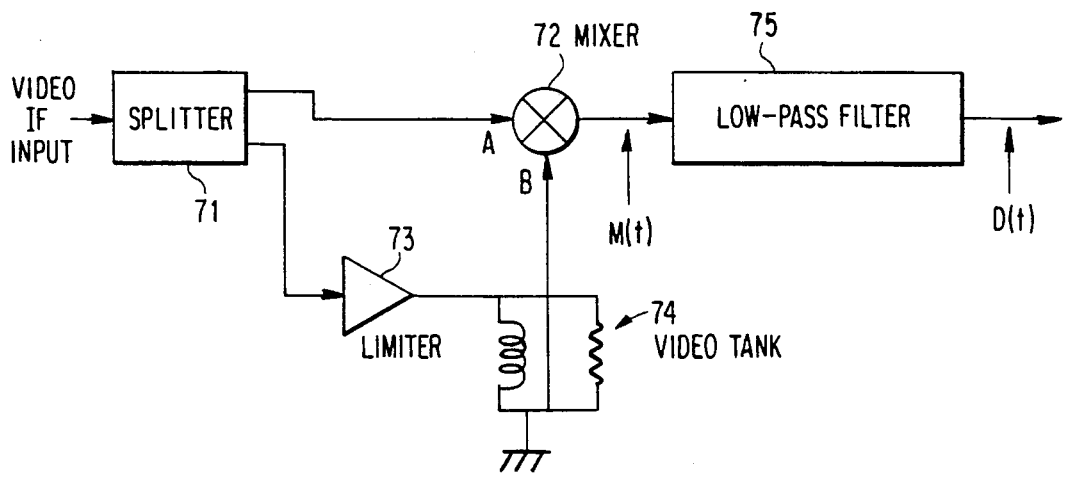
FIG. 16 is a block diagram of a first alternative data detector used in the set top converter shown in FIG. 15.

In simplified form, the detector 64 used to obtain video can be modeled as shown in FIG. 16. It is demonstrated below that the presence of phase changes in the video IF carrier (for conveying data) produces "white-going" pulses in the detected video signal.

The circuit shown in FIG. 16 is a simplified model of the circuitry contained within the video IF IC 64. For this circuit, the video IF carrier is split in splitter 71, with one splitter output applied directly to one input of a mixer 72. The second splitter output is amplitude limited in limiter 73, filtered in video L-C tank circuit 74, and then applied to the second input of mixer 72. Since the L-C filter has zero phase shift at resonance (which is adjusted to be 45.75 MHz), the signal at both mixer inputs are in-phase in the absence of phase changes imposed on the video carrier. For this case, the mixer output is $$M(t)=[V(t)\cos(\omega t)][K\cos(\omega t)], \qquad (1)$$

where $V(t)$ = baseband video waveform voltage as a function of time, $K$ = amplitude of limited video IF carrier at mixer input B, and $\omega=2\pi(45.75 \text{ MHz})$. (Note: NTSC uses negative modulation. Therefore, the picture carrier, mathematically expressed by $V(t)\cos(\omega t)$ above, has maximum amplitude at sync tip. Therefore, in equation (1) and all subsequent equations, $V(t)$ is maximum at sync tip and minimum at peak white). Thus, $$M(t)=0.5[KV(t)][\cos(2\omega t)+\cos(0)]. \qquad (2)$$

Neglecting the high frequency term (which is removed by filtering), the detected signal at the output of low pass filter 75 is $$D(t)=CV(t), \qquad (3)$$

where $C=0.5K$. Data values are sent by momentarily changing the phase of the video IF carrier, as shown in FIG. 3. This phase change appears directly at mixer input A. However, since the phase change also causes a momentary change in frequency, the phase shift through the LC filter is no longer zero. Thus, mixer inputs A and B are no longer in phase. For this case, $$M(t)=[V(t)\cos \omega t][K\cos(\omega t-y)], \qquad (4)$$

where y represents the phase difference between mixer input signals A and B. At the output of the low pass filter 75 (where the high frequency term of equation (4) can be neglected), the detected signal is $$D(t)=CV(t)\cos(y), \qquad (5)$$

where $C=0.5K$. The following conclusions are made from equation (5):

1. During those times in the video signal in which no phase change occurs, y=0 and, therefore, cos(y) equals 1. Therefore, D(t) equals CV(t), as in equation (3).

2. Whenever any phase change occurs in the video IF carrier, y is not equal to 0 and cos(y) is less than 1. Therefore, D(t) is reduced as compared to the output obtained if no phase change were present. Since D(t) is reduced, the phase change, regardless of polarity, produces a white-going perturbation in the detected video signal. Since this perturbation is always white-going, it will not affect any horizontal or vertical synchronization circuits in the TV receiver that is connected to the set top converter.

Given that the phase changes used to convey data are very short in duration, occur during non-viewable portions of the video signal (horizontal blanking interval or vertical blanking interval), always produce a white-going pulse in the detected video, which will not affect television synchronizing circuits, then the converter is not burdened with any circuitry to remove the phase changes, or attempt to correct for any perturbations which occur in the detected video.

Figure 17:
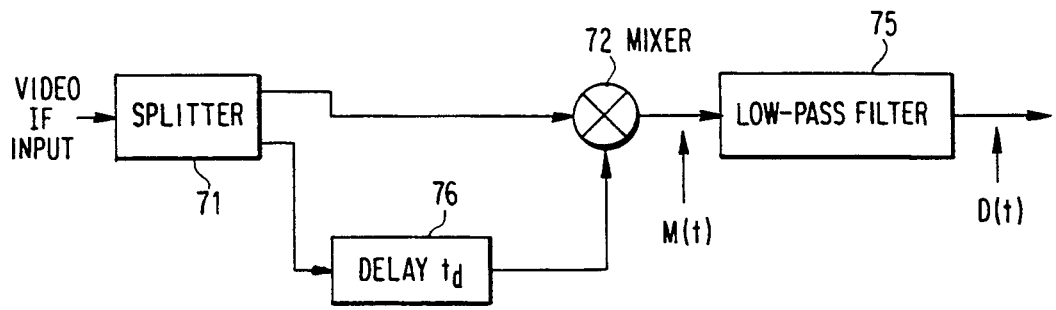
FIG. 17 is a block diagram of a second alternative data detector used in the set top converter shown in FIG. 15.

Alternatively, if data values are transmitted using the phase change polarity method shown in FIG. 4, then the circuit shown in FIG. 17 would be used. With this circuit, the presence of phase changes in the video IF carrier (for conveying data) produces pulses of different polarity at the output of the data detector, thereby recovering the data information.

The video carrier (at 45.75 MHz) is applied to the detector input and split in splitter 71 as before, with one splitter output applied directly to one input of mixer 72. The second splitter output is delayed by delay element 76 and then applied to the second mixer input. The delay time $t_d$ is chosen such that the mixer inputs are in quadrature, or out of phase by 90°. In the absence of a transmitted phase change, the mixer output is $$M(t) = [V(t)\cos(\omega t)][V(t)\cos(\omega t - z)], \quad (6)$$

where V(t) = baseband video waHxform voltage as a function of time, $z = \pi/2$ radians, or 90°, and $\omega = 2\pi(45.75 \text{ MHz})$. Thus, $$M(t) = 0.5V(t)^2[\cos(2\omega t - z) + \cos(-z)]. \quad (7)$$

Neglecting the high frequency term (which is removed by filtering), the detected signal at the output of the low pass filter 75 is $$D(t) = 0. \quad (8)$$

since the cosine of −90° is zero. If the data bit is sent by momentarily changing the phase of the video IF carrier, this phase change appears directly at mixer input A. However, because of the delay element 76, the phase change occurs at input A $t_d$ seconds before it appears at input B. Thus, mixer inputs A and B are no longer in phase. For this case, $$M(t) = [V(t)\cos(\omega t)][V(t)\cos(\omega t + y - z)], \quad (9)$$

where y represents the phase difference between mixer input signals A and B as caused by the transmitted phase change. The detected signal at the low pass filter output is then $$D(t) = 0.5V(t)^2\cos(y - z). \quad (10)$$

Since z equals 90°, then cos(y−z) equals sin(y). Therefore, $$D(t) = 0.5V(t)^2\sin(y). \quad (11)$$

From equations 8 and 11, the following observations can be made concerning the data detector:

1. Even in the absence of limiters, the output of the data detector is zero when no data is transmitted; i.e., when no phase changes occur in the video IF carrier. In practice, some output will occur because it is very difficult to keep both mixer inputs precisely in quadrature. Also, incidental phase modulation of the picture carrier by video will result in some video information at the data detector output.

2. Since the sine function is an odd function (meaning that sin(x) = −sin(−x)), then equation 11 indicates that, when a phase change is transmitted, the data detector output is either positive or negative, depending upon the polarity of the phase change. Thus, the transmitted data bit value can be recovered.

Figure 18:
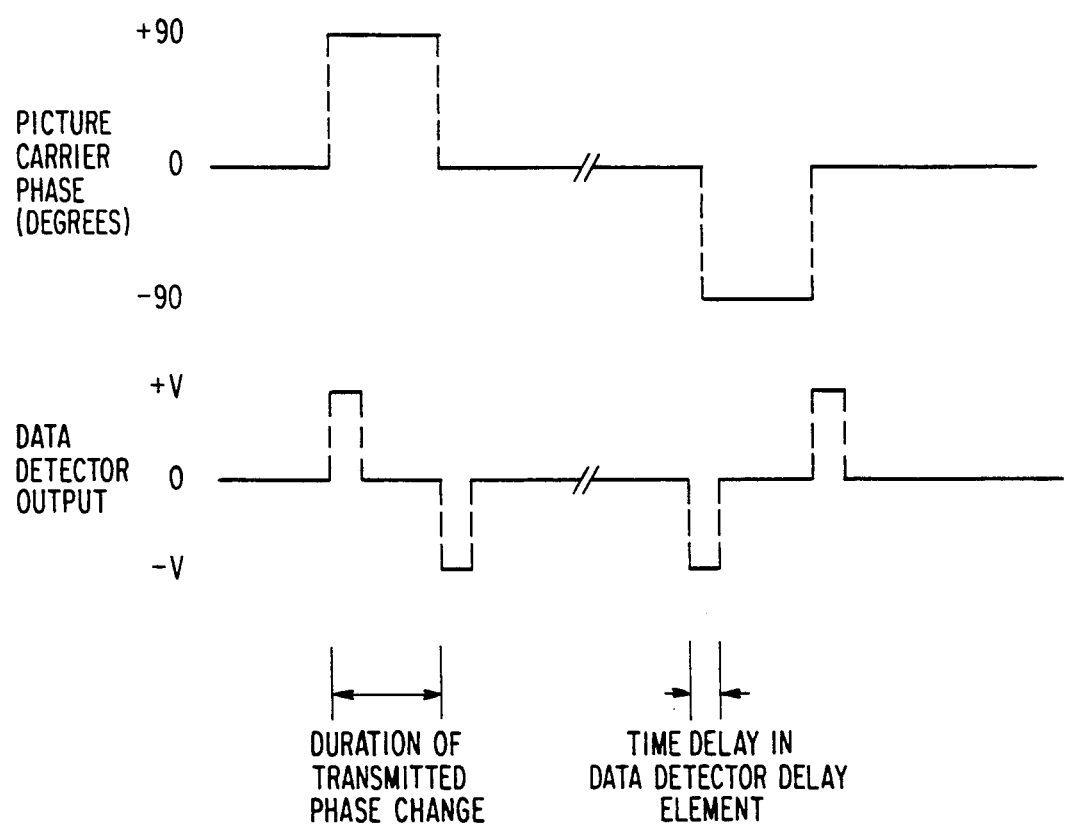
FIG. 18 is timing diagram showing the output of the data detector shown in FIG. 17.

Assuming the duration of the transmitted phase change is greater than $t_d$ (which is the time delay of the delay element 76), the data detector actually outputs two pulses per data bit, as shown in FIG. 18.

From the foregoing description, it will be appreciated that the difference between the phase change magnitude and the phase change polarity methods of data transmission is primarily in the detection angle in the synchronous detector used to recover data and in the nature of the detector output. In the magnitude method, the detection angle is zero degrees and the detector output is a pulse having one of two possible amplitudes, but always the same polarity. For the polarity method, the angle is 90° and the detector output is either positive or negative.

Figure 1:
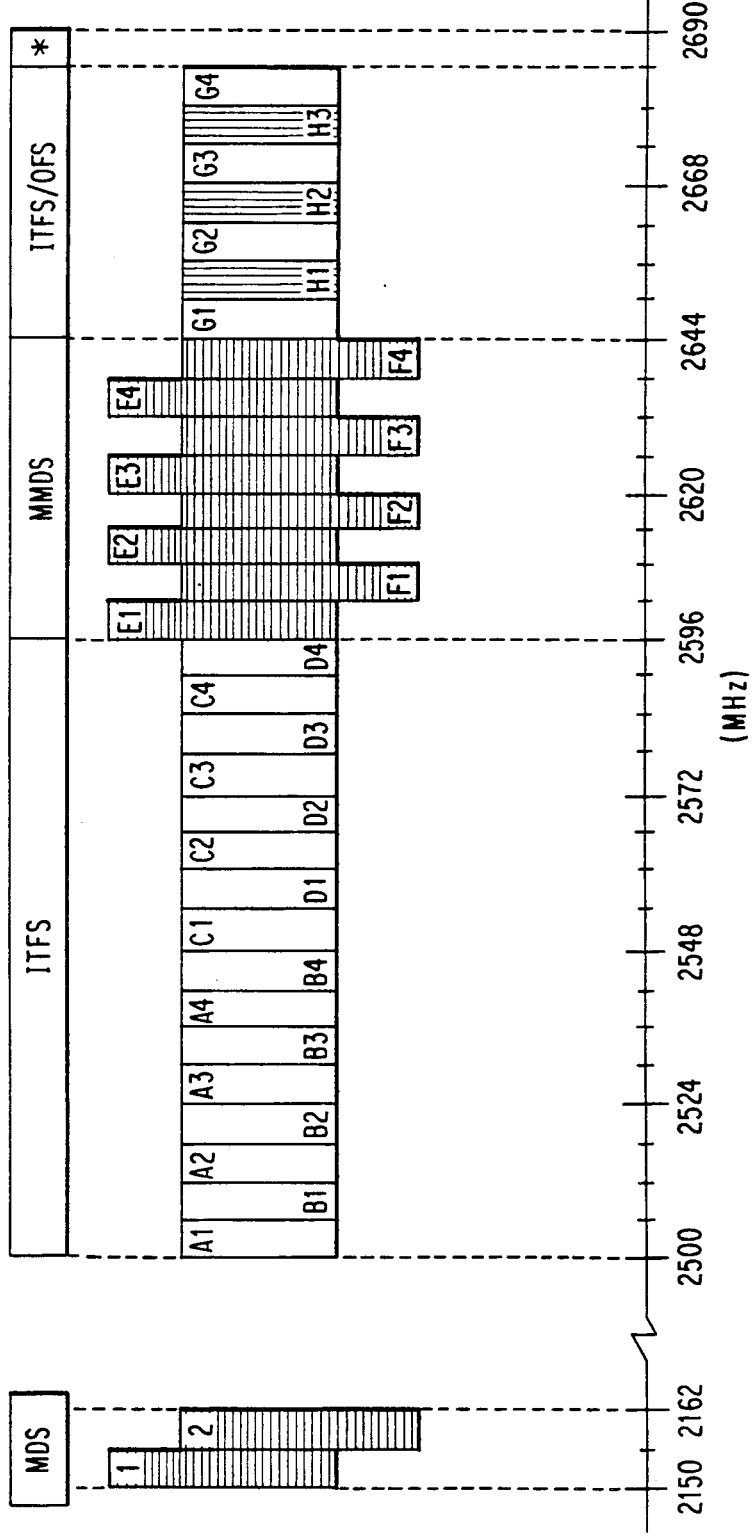
FIG. 1 is a frequency allocation plan for MMDS, ITFS and OFS services.
Figure 2:
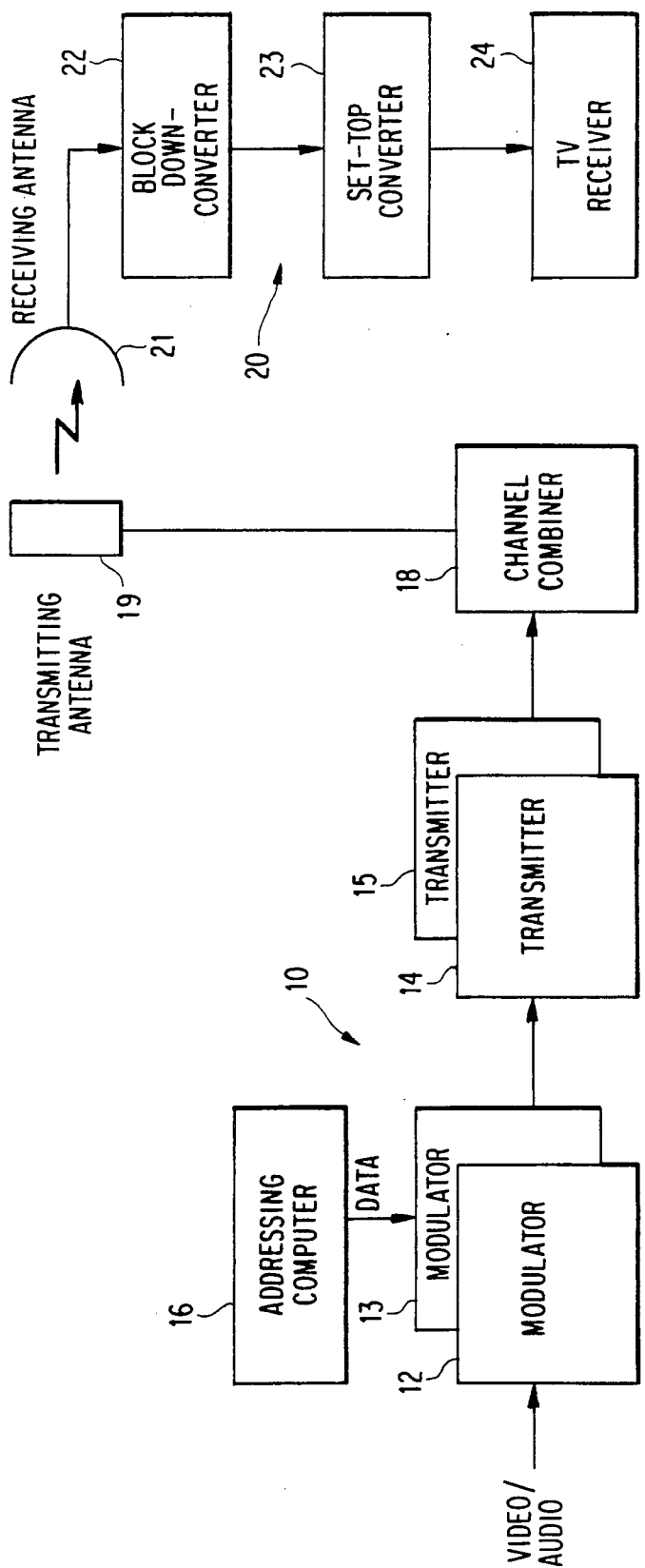
FIG. 2 is a block diagram showing the basic components of a wireless cable system.

Returning now to FIG. 15, the video IF output from IF IC 64 is filtered in L-C AFC tank circuit 65 and amplitude limited in limiter 66 and supplied as the video IF input to a second IF IC 67. IC 67 may be an MC1366SP IC manufactured by Mitsubishi. IC 67 also receives the audio IF (41.25 MHz) from SAW filter 61 and provides a detected audio output (4.5 MHz) to the video IF IC 64. The outputs from IC 64 are baseband audio and video signals which are applied to the remodulator 68. The output of the remodulator is switchable between channels 2, 3 or 4 and is applied to the TV receiver 24 (shown in FIG. 2).

Data detection is performed by video IF IC 67. Video IF IC 67 contains a pseudo-synchronous detector for video and therefore employs the same signal processing as described above for IC 64. However, the input to IC 67 has virtually all of the amplitude information removed by limiter 66. Thus, the video output to the dual level voltage comparator 80 contains a high amplitude pulse when a phase change is transmitted, and is quiescent at other times. Since the amplitude of the pulse is proportional to the cosine of the phase change, the data value transmitted can be determined by comparator 80 from the amplitude of the pulse. The data output from the comparator 80 is supplied to a gate array 81 which is illustrated in FIG. 17 and described in more detail hereinafter. The gate array 81 decodes the received data and provides control signals to the attenuator 62 for video unscrambling and to the 180° phase shifter 63 for audio unmasking. In addition, the gate array provides an output to a display, such as a light emitting diode (LED) display, to show the status of a received signal.

There is a communication bus between the gate array 81 and the microprocessor 83 which controls the tuner 60. Addressing data is transmitted over this bus to the microprocessor 83 and the microprocessor, in turn, controls the gate array to allow authorized video descrambling and audio unmasking of received program material. The microprocessor 83 runs under the control of a stored program in memory 84 which also stores authorization codes.

The microprocessor 83 performs, in addition, the usual control functions associated with microprocessor controlled set top converters. To that end, a keyboard 85 is provided to allow for user input, such as channel selection, and in addition, there is a remote receiver 86, such as an infrared (IR) receiver, for receiving remotely transmitted user inputs. In addition, a detected AFC signal from the video IF IC 67 is digitized in digitizer 87 and supplied to microprocessor 83. The digitized AFC signal is used by the microprocessor 83 to determine when the picture carrier crosses through 45.75 MHz. The local oscillator in tuner 60 is changed accordingly to place the picture carrier as close as possible to 45.75 MHz. For volume control, the microprocessor 83 provides six bits to a digital-to-analog (D/A) converter 88. The analog output of the D/A converter 88 is a voltage level proportional to the desired volume level and is applied to the video IF IC 64 to effect the volume control function.

Figure 19:
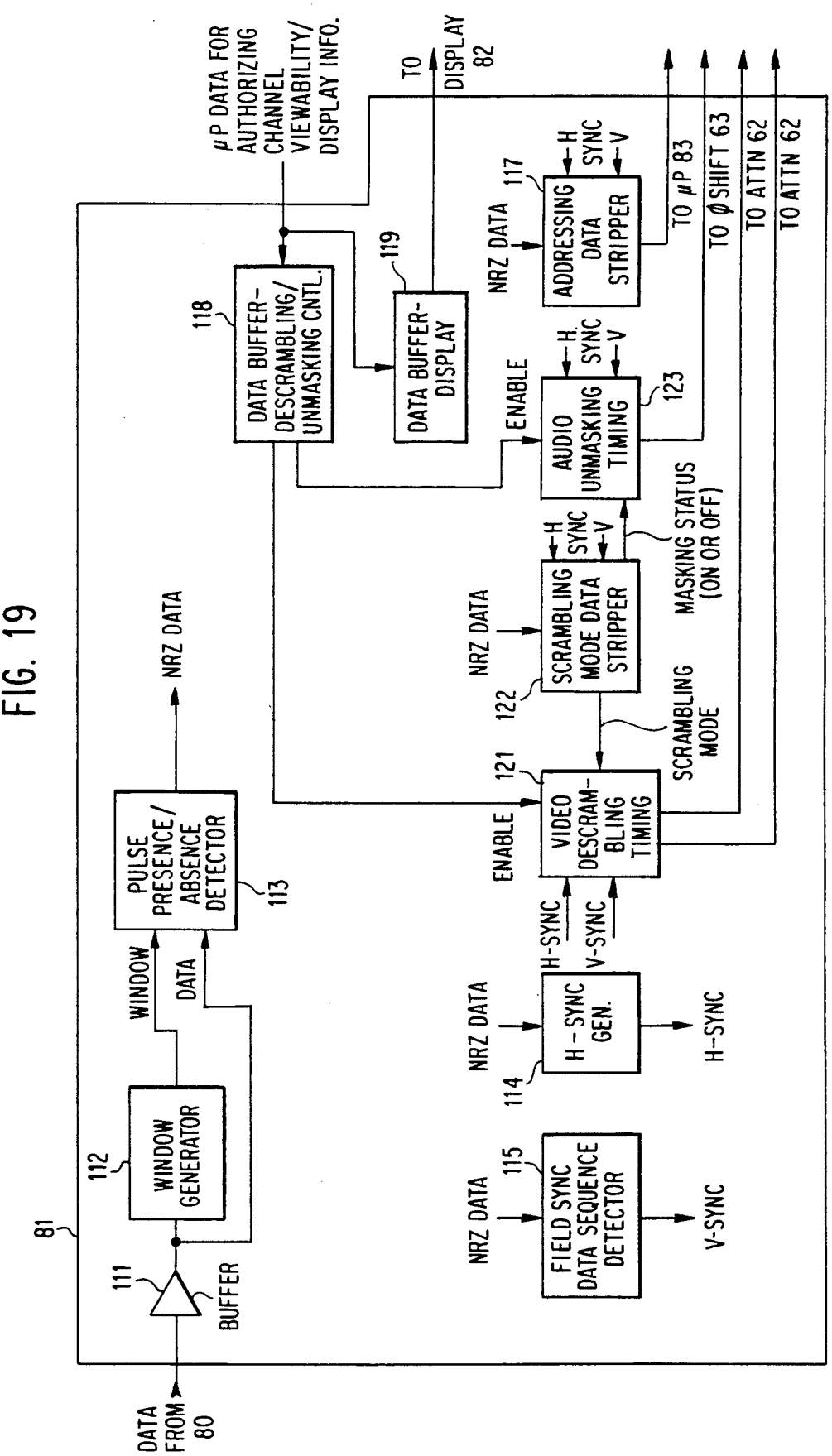
FIG. 19 is a block diagram of the gate array used in the video detector shown in FIG. 15.

Reference is now made to FIG. 19 which shows in more detail the gate array 81. In the preferred embodiment, the dual level voltage comparator is simply a wire and there is only one signal into the gate array from the video IF IC 67. This is received by a buffer 111 and supplied to a window generator 112. The window generator forms a signal which is asserted during the time a pulse is expected. The output of the window generator 112 enables pulse detector 113 which receives the data signal from buffer 111 and forms an internal non-return-to-zero (NRZ) data signal from the applied data signal. Horizontal and vertical sync signals are derived from the NRZ data waveform by horizontal sync detector 114 and field sync data sequence detector 115, respectively.

Based on enabling data received from the microprocessor 83, the NRZ data and horizontal and vertical sync signals are used to generate control signals for audio unmasking and video descrambling. Communication between the microprocessor 83 and the gate array 81 consists of two serial data links, where data transfer is one-way for each link. Data from the gate array to the microprocessor consists of addressing commands only. The data is applied to the microprocessor in NRZ format via addressing data stripper 117. The gate array simply outputs bytes of data to the microprocessor as those bytes are received via over-the-air transmission. No means exists for the microprocessor to interrupt the output from the gate array since it would serve no purpose because the gate array cannot stop the flow of addressing commands sent over the air. Other data received over the air by the gate array, such as scrambling mode or the field sync data sequence, is not sent to the microprocessor. While data is being received by the gate array which is not addressing commands, the gate array maintains the line to the microprocessor in a high, or mark, state.

Addressing commands provided to the microprocessor 83 by the gate array 81 are processed as received. These commands control the state of the converter and the channels and services allowed for the subscriber. When a new channel is selected, or an addressing command affects the authorization of a currently selected channel, the microprocessor 83 sends serial data to the gate array to enable/disable circuits for video descrambling and audio masking. This data is stored in data buffer 118. Data is also sent to the gate array to control the front panel display via display buffer 119.

Video descrambling data in buffer 118 enables (or disables) video descrambling timing circuit 121 which receives scrambling mode data from scrambling mode data stripper 122. The scrambling mode data is derived from the NRZ data output from detector 113. The output of the video descrambling timing circuit controls the attenuator 62. Video descrambling data in buffer 118 also enables (or disables) audio unmasking circuit 123. The scrambling mode data stripper 122 also supplies a masking status signal (on or off) to audio unmasking timing circuit 123, this data also being derived from the NRZ data output from detector 113. The output of the audio unmasking timing circuit controls the 180° phase shifter 63.

Figure 20A:
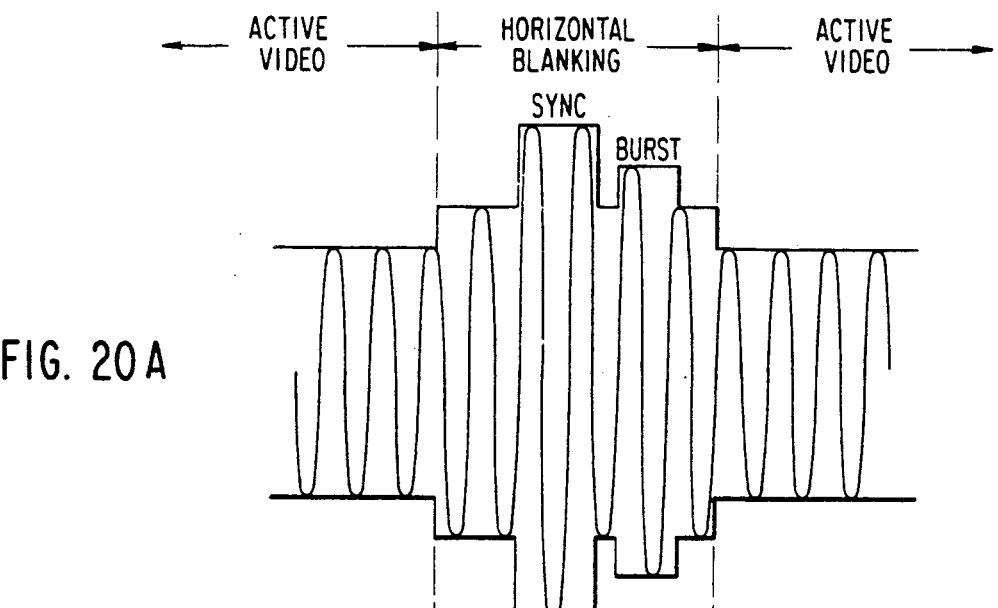
FIGS. 20A, 20B, 20C, and 20D are waveform diagrams illustrating the process of unscrambling the video signal for either horizontal sync attenuation or omission modes of scrambling.
Figure 20B:
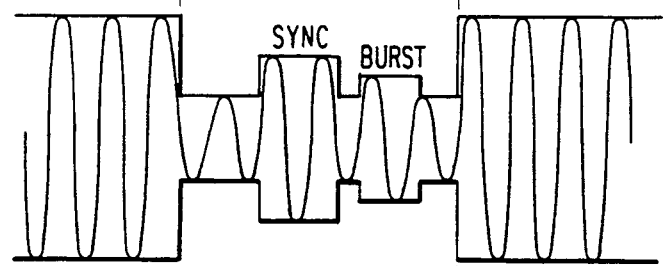
Figure 20C:
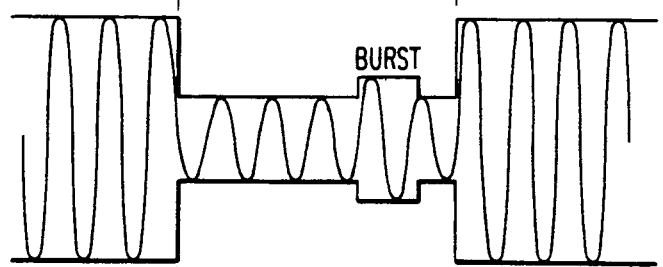
Figure 20D:
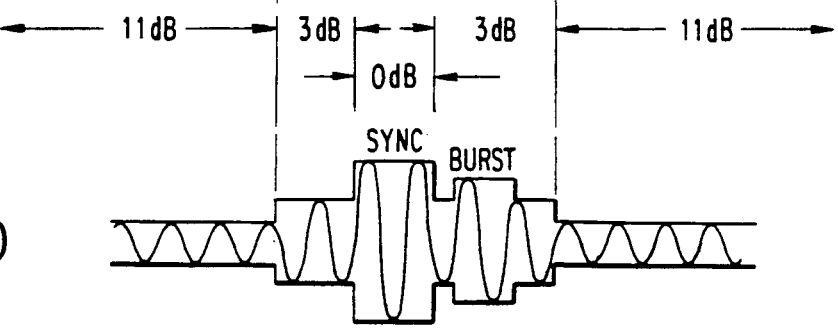

FIGS. 20A to 20D are timing diagrams illustrating how the attenuator 62 in FIG. 15 is switched to unscramble video when horizontal sync attenuation and horizontal sync omission is invoked. Each of the waveforms shown in these FIGURES illustrate how the amplitude of the picture carrier varies during the horizontal blanking interval for a standard, scrambled and unscrambled NTSC television signal. FIG. 20A is a standard NTSC transmission and is shown for reference only. The sync tip represents maximum carrier level. FIG. 20B shows the transmitted signal when sync attenuation is invoked. Below the waveform in FIG. 20B is the state of the attenuator during each time segment of the horizontal blanking interval to descramble the transmitted waveform. FIG. 20C shows the transmitted signal when sync omission is invoked. Below the waveform in FIG. 20C is the state of the attenuator during each time segment of the horizontal blanking interval to descramble the transmitted waveform. FIG. 20D shows the descrambled waveform. Note that a reduction in the amount of attenuation effectively provides gain. Through proper control of the attenuator 62, active video and sync can be proportioned properly to unscramble the video.

Figure 21A:
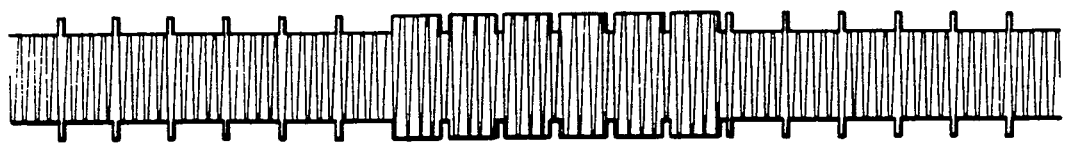
FIGS. 21A, 21B and 21C are waveform diagrams illustrating the process of unscrambling the video signal for vertical sync omission mode of scrambling.
Figure 21B:
Figure 21C:
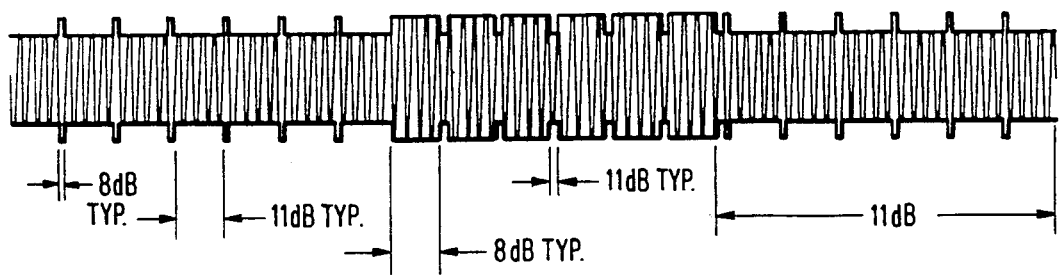

While the preferred embodiment contemplates horizontal sync attenuation or omission for scrambling the transmitted video signal, those skilled in the art will recognize that it is also possible to use another level of vertical scrambling whereby all equalizing pulses and vertical serration pulses are stripped. Such a signal would have applications in classical cable systems. Restoration of the scrambled signal would proceed along the same line as that for horizontal sync attenuation or omission scrambling modes, as illustrated in FIGS. 21A, 21B and 21C. FIG. 21A shows the standard NTSC transmission for lines one to nine. FIG. 21B shows the transmitted waveform with equalizing pulses and vertical serration pulses stripped for lines one to nine. FIG. 21C shows the restored signal with the attenuator values noted.

The functions performed by each block within the converter block diagram shown in FIG. 15 are described below. The basic converter architecture has the following characteristics:

1. All video descrambling/audio unmasking is accomplished by processing the video IF signal.

2. The processed (i.e., corrected) video IF signal, along with the audio IF signal, is applied to two standard video IF amplifier/detector ICs 64 and 67. These ICs provide fast automatic gain control (AGC), automatic frequency control (AFC), volume control and provides baseband audio and video outputs. The baseband signals are applied to a remodulator 68 to obtain a channel 2 or channel 3 output for the TV receiver. The baseband signals can also be provided to rear panel connectors.

(Note: From items 1 and 2 above, the converter is a "baseband" converter in the sense that baseband audio and video signals are derived within the converter. However, with regard to video descrambling and audio unmasking, the converter is not a baseband converter. This converter architecture allows for low cost, while providing desirable features such as baseband video and audio outputs, multiple channel outputs and volume control).

3. No circuitry exists for correcting the phase changes on the video carrier used for data/timing information. (Phase reversals transmitted for audio masking are removed).

The down converted signal from the block down converter is applied to the tuner 60 via the converter RF input. A single or double conversion tuner can be used. The tuner output is applied to a surface acoustic wave (SAW) filter 61 having separate outputs for the audio and video carriers. The frequency response of the SAW filter is as required for standard NTSC signals.

The video descrambling circuit consists of a variable attenuator 62 that can be placed in one of four discrete states: 0 dB, 3 dB, 8 dB or 11 dB. The circuit unscrambles video by effectively providing gain during those portions of the video signal that were attenuated in transmission.

TABLE 1

| Attenuator state for scrambling modes 1, 2 and 3 | | | | |
|---|---|---|---|---|
| | Active Video | Front Porch | H-Sync Pulse | Back Porch |
| 1-No Scrambling | 0 dB | 0 dB | 0 dB | 0 dB |
| 2-Sync Attenuation | 11 dB | 3 dB | 3 dB | 3 dB |
| 3-Sync Omission | 11 dB | 3 dB | 0 dB | 3 dB |

Table 1 defines the selected attenuation levels for scrambling modes 1, 2 and 3 (which are applicable for all but the first nine lines of each field). Table 2 defines the selected attenuation levels for scrambling modes A, B and C (which are applicable for the first nine lines of each field). It will of course be understood that gain is achieved by removing attenuation.

TABLE 2

| Attenuator state for scrambling modes A, B and C | | | | |
|---|---|---|---|---|
| | Active Video | Eq Pulse first 6 | V-Sync Pulse | Eq Pulse last 6 |
| No Scrambling | 0 dB | 0 dB | 0 dB | 0 dB |
| A-No Vertical Scrambling; Sync Atten. or Omission | 11 dB | 11 dB | 11 dB | 11 dB |
| B-Omit First Eq Pulses | 11 dB | 11 dB | 8 dB | 8 dB |
| C-Omit Last Eq Pulses | 11 dB | 8 dB | 8 dB | 11 dB |

Addressing data is available from the output of video IF IC 67 in the form of narrow pulses. In the general case where the magnitude of the transmitted video carrier phase change is not 0° for either data values of "0" or "1", the output of video IF IC 67 consists of pulses having two possible amplitudes. The dual level voltage comparator 70 asserts one of two outputs depending upon the amplitude of the received pulse, as follows: Two voltage reference levels are applied to the comparator 70, where the first level is less than the second level. The comparator asserts a first output when the received pulse is greater than the first reference level and less than the second reference level. A second output is asserted when the received pulse is greater than both reference levels. Both comparator outputs are applied to the gate array 71 where the data is converted to NRZ format for the microprocessor 73.

In the preferred embodiment for data transmission modes 1, 2 and 3, a data value of "1" is sent using a 180° phase change; a data value of "0" is sent using a 0° phase change, or effectively no phase change transmitted. Thus, for this case, the dual level voltage comparator 70 is simply reduced to a wire. The gate array 71 can establish windows of time during which a pulse is expected. The presence or absence of a pulse within each window is used to determine the data value transmitted.

The gate array 71 performs the following functions:

Extracting Addressing Data: Addressing data is obtained from the dual level voltage comparator, or directly from video IF IC 67, as described above. The data passed to the microprocessor 73 is in NRZ format. If an auxiliary data path is used, the gate array ignores this data.

Generating Timing Signals: The gate array develops all internal converter timing signals required for video descrambling and audio unmasking. Horizontal timing is derived directly from received pulses. Timing offsets are provided by the gate array depending upon the exact position of phase changes in the video line. Vertical timing is accomplished by counting the number of consecutive ones received, as previously described.

User input is made through a front panel keyboard 75 and a remote control transmitter (not shown). Selected channel numbers are displayed on a front panel display 72. This interface allows the user to turn the converter on/off, select channels and implement other user-related features. User input, addressing command processing and control of the front panel display is managed by the microprocessor 73. Addressing commands are processed to control viewable channels and enable/disable selected features. The microprocessor 73 sends data to the gate array 71 to enable or disable video descrambling and audio unmasking functions. The microprocessor 73 also controls all channel tuning functions.

The audio signal is processed using both video IF ICs 64 and 67, as follows:

The audio IF carrier at 41.25 MHz from the SAW filter 61 is applied to IC 67. The limited video IF carrier is also applied to IC 67. These two carriers are mixed within the IC to produce an audio IF carrier at 4.5 MHz. Note that for this circuit configuration, audio distortion resulting from video modulation (such as sync buzz) is greatly reduced because a limited video IF carrier is used. The 4.5 MHz carrier is then applied to IC 64 for detection. IC 64 contains an FM detector to derive the baseband audio signal. It also contains an attenuator to provide volume control.

It should be noted that either IC 64 or IC 67 could be used to detect the 4.5 MHz audio IF signal. The audio unmasking circuitry consists of a 180° phase shift network 63 and switch. Phase is altered from 0° to 180° in coincidence with transmitted phase reversals. This action removes the phase reversals on the video IF carrier and thereby unmasks audio.

The phase reversals transmitted for data delivery have very little perceptible effect on audio. Therefore, no circuitry exists to correct the video IF signal for the short-duration phase changes used for data transmission.

Briefly summarizing, the basic method for conveying data utilizes short-duration phase changes of the video carrier. The receiver converts the phase changes to a pulse using a synchronous detector. Pulse amplitude is dependent upon the magnitude of the phase change. Data is conveyed by using a different phase change (and thereby detecting different pulse amplitudes in the receiver) for data values of "1" and "0". Additionally, if more than one phase change is transmitted in each horizontal blanking interval, pulse position methods of data conveyance are used to increase the number of data paths per channel.

There are four specific data transmission modes, all of which are based upon the basic methods of pulse amplitude and pulse position described above. Alternatively, pulse polarity and pulse position could be used. The specific methods described provide one, two or three data paths per channel. The concepts and methods disclosed can be extended such that more than two phase changes can be sent during each horizontal blanking interval. Thus, using the pulse amplitude or pulse polarity and pulse position concepts disclosed, more than three data paths per channel are possible.

Data is conveyed within the 6 MHz television channel spectrum without using additional carriers and without perceptibly affecting the visual or aural content of the television program. Since data is transmitted using an FM signal, it has all of the advantages that FM has with noise, multi-path reception and signal fades, which are common in microwave broadcasts. The data signal also provides video timing information (vertical and horizontal) for video descrambling and audio unmasking. The position of phase changes with respect to the video signal provides horizontal timing; data content (i.e., consecutive transmission of more than 11 "1" bits) provides vertical timing.

The system according to the invention allows for data transmission with no video scrambling or audio masking. Video scrambling is accomplished in lines 10-262 of each field by attenuating the horizontal blanking interval, and by omitting horizontal sync pulses. Scrambling is accomplished during lines 1-9 of each field by omitting vertical serration pulses and either the first or second group of equalizing pulses. The video scrambling method guarantees that at least six equalizing pulses per field are present at the normal −40 IRE level. This provides a maximum video IF level for transmitter ALC circuitry operation. The scrambling options for lines 10-262 can be combined with the options for lines 1-9, creating six different scrambling modes. Scrambling modes can be changed dynamically, but no faster than a field rate. Thus, no line-to-line changes are allowed. Furthermore, changes are made only when there is a scene change in the program. This approach allows operation with non-linear microwave transmitters. Video descrambling is accomplished at the receiver by processing the video IF signal using inexpensive attenuators and a switch.

Audio masking is accomplished by reversing the phase of the picture carrier. The phase reversals occur in bursts at a vertical rate, thereby causing an objectionable 60 Hz tone in the uncorrected audio. Unmasking is performed at the receiver by reversing the carrier phase at each transmitted phase reversal.

The converter architecture allows construction of a cost effective product, while retaining the performance required in a wireless cable environment and the user features that cable TV subscribers find highly desirable. All video descrambling functions are performed on the video IF signal, which is much less expensive than typical baseband descrambling circuitry. By using mass produced (and therefore low cost) devices, baseband video and audio is obtained and re-modulated to a VHF channel output frequency. These low cost devices provide high performance and desirable user features, such as fast AGC operation, AFC, baseband video and audio outputs, RF output at channel 3 or 4, volume control, and video blanking and audio muting.

While the invention has been described in terms of a preferred embodiment, those skilled in the art will recognize that the invention can be practiced with modification within the spirit and scope of the appended claims. For example, the invention was specifically developed for use in wireless cable television systems, but the teachings and techniques can be applied to classical cabled systems as well. Moreover, although the invention was developed for and applied to an NTSC transmission, the methods disclosed are highly compatible with PAL signals.

We claim:

1. In a television system of the type including a modulator receiving input signals from a video source and an audio source and providing a video intermediate frequency video modulating signal and an audio intermediate frequency modulating signal to a transmitter, said transmitter being responsive to said intermediate frequency video and audio modulating signals for transmitting a modulated radio frequency signal to a plurality of receiving sites, each of said receiving sites having a television receiver, the improvement comprising:

said modulator including encoder means for scrambling the video and masking the audio intermediate frequency modulation signals, said encoder means further generating data signals as a sequence of binary "1s" and "0s", said data signals phase modulating video carrier during a horizontal blanking period, said modulator further including means for combining said scrambled video signals with said phase modulated video carrier, and said transmitter transmitting the combined video signal with said masked audio signal to said plurality of receiving sites; and each of said receiving sites including a means for receiving said combined video signal and detecting said data signals and a converter responsive to said detected data signals for descrambling said video and unmasking said audio portions of received signals.

2. The television system recited in claim 1 wherein said audio portion of said signals is masked by reversing the phase of said video carrier during a portion of each field, said data signals carrying information for unmasking said audio portion of said signals at said receiving sites by correcting the phase of said video carrier.

3. The television system recited in claim 1 wherein said data signals phase modulate said video carrier after a color burst signal to provide at least one bit of binary data per horizontal blanking period.

4. The television system recited in claim 1 wherein said data signals phase modulate said video carrier before a color burst signal to provide at least one bit of binary data per horizontal blanking period.

5. The television system recited in claim 1 wherein said data signals phase modulate said video carrier before and after a color burst signal to provide at least two bits of binary data per horizontal blanking period.

6. The television system recited in claim 1 wherein said data signals phase modulate said video carrier before and after a color burst signal and a time period between modulations of said video carrier is varied between first and second values to provide three bits of binary data per horizontal blanking period.

7. The television system recited in claim 1 wherein said binary "1s" phase modulate said carrier at a first phase angle and said binary "0s" phase modulate said carrier with a second phase angle having a different absolute value than said first phase angle.

8. The television system recited in claim 7 wherein a difference of the values of said first and second phase angles differentiates a binary "1" from a binary "0".

9. The television system recited in claim 1 wherein said binary "1s" phase modulate said carrier at a first phase angle and said binary "0s" phase modulate said carrier with a second phase angle, said first and second phase angles are of opposite polarities.

10. The television system recited in claim 1 wherein said video portion of said signals is scrambled at said transmitter by attenuating a sync signal during said horizontal blanking period and said data signals carry information for descrambling said video portion of said signals at said receiving sites by reconstituting said sync signal.

11. The television system recited in claim 1 wherein said video portion of said signals is scrambled at said transmitter by stripping a sync signal during said horizontal blanking period and said data signals carry information for descrambling said video portion of said signals at said receiving sites by reconstituting said sync signal.

12. The television system recited in claim 1 wherein said video portion includes a vertical sync interval containing equalizing pulses and vertical serration pulses and said video portion of said signals is scrambled by omitting said vertical serration pulses and at least some of said equalizing pulses, said data signals carrying information for descrambling said video portion of said signals at said receiving sites by reconstituting said sync and equalizing pulses.

13. The television system recited in claim 1 wherein said video portion of said signals is scrambled at said transmitter by attenuating a sync signal during said horizontal blanking period and by omitting said sync signal during said horizontal blanking period, the scrambling technique being selectable at said transmitter and said data signals carrying information for descrambling said video portion of said signals at said receiving sites by reconstituting said sync signal.

14. The television system recited in claim 1 wherein said video portion includes a vertical sync interval containing equalizing pulses and vertical serration pulses and wherein said video portion of said signals is scrambled at said transmitter by attenuating a sync signal during said horizontal blanking period or by omitting said sync signal during said horizontal blanking period in combination with scrambling by omitting said vertical serration pulses and at least some of said equalizing pulses, said data signals carrying information for descrambling said video portion of said signals at said receiving sites by reconstituting said sync signals and said equalizing and vertical serration pulses.

15. The television system recited in claim 14 wherein said audio portion of said signals is masked by reversing the phase of said video carrier during a portion of each field, said data signals further carry information for unmasking said audio portion of said signals at said receiving sites by correcting the phase of said video carrier.

16. The television system recited in claim 15 wherein said data signals additionally carry addresses for addressing individual ones of said plurality of said receiving sites, said receiving sites being addressed to provide authorization to receive said information for descrambling and unmasking said signals.

17. An encryptor for a transmitter of a television system comprising:
 buffer means for receiving baseband video signals;
 video scrambling means connected to said buffer means for scrambling video signals;
 data insertion means connected to said video scrambling means for phase modulating a video carrier during a horizontal blanking period to represent a sequence of binary "1s" and "0"; and
 audio masking means connected to said video scrambling means for reversing the phase of said video carrier during a portion of each field thereby masking audio signals which are transmitted with said video signals;
 said sequence of binary "1s" and "0s" conveying data for descrambling said video signals and unmasking said audio signals.

18. The television transmitter recited in claim 17 wherein said video scrambling means comprises an attenuator for attenuating a sync signal during a horizontal blanking period.

19. The television transmitter recited in claim 17 wherein said video scrambling means comprises a sync stripper for stripping a sync signal during a horizontal blanking period.

20. The television transmitter recited in claim 17 wherein said video signals include a vertical sync interval containing equalizing pulses and vertical serration pulses and said video scrambling means comprises a sync stripper for stripping said vertical serration pulses and at least some of said equalizing pulses.

21. The television transmitter recited in claim 20 wherein said sync stripper additionally strips a sync signal during a horizontal blanking period of said video signals.

22. The television transmitter recited in claim 21 further comprising an attenuator for attenuating said sync signal during said horizontal blanking period, said sync stripper and said sync attenuator being selectively operated to provide a plurality of modes of video scrambling.

23. The television transmitter recited in claim 22 further comprising control means connected to said sync stripper and said sync attenuator for controlling said plurality of modes of video scrambling.

24. The television transmitter recited in claim 23 wherein said control means includes an automatic picture level sensor, said control means changing modes of video scrambling dynamically but only when scenes change as detected by said automatic picture level sensor.

25. The television transmitter recited in claim 17 wherein said data insertion means phase modulates a video carrier after a color burst signal to provide at least one bit of binary data per horizontal blanking period.

26. The television transmitter recited in claim 17 wherein said data insertion means phase modulates a video carrier before a color burst signal to provide at least one bit of binary data per horizontal blanking period.

27. The television transmitter recited in claim 17 wherein said data insertion means phase modulates a video carrier before and after a color burst signal to provide at least two bits of binary data per horizontal blanking period.

28. The television transmitter recited in claim 17 wherein said data insertion means phase modulates a video carrier before and after a color burst signal and a time period between modulations of said video carrier is varied between first and second values to provide three bits of binary data per horizontal blanking period.

29. The television transmitter recited in claim 17 wherein said binary "1s" phase modulate a video carrier at a first phase angle and said binary "0s" phase modulate said video carrier at a second phase angle having different absolute value than said first phase angle.

30. The television transmitter recited in claim 29 wherein a difference of the values of said first and second phase angles differentiates a binary "1" from a binary "0".

31. The television transmitter recited in claim 29 wherein said first and second phase angles are of opposite polarities.

32. A converter for use in a television system of the type wherein video signals are scrambled and audio signals are masked and composite signals are transmitted with data signals as a sequence of binary "1s" and "0s", said data signals phase modulating a video carrier during a horizontal blanking period, said converter comprising:
    tuner means for receiving transmitted composite signals and separating audio signals from video signals into intermediate frequency audio and video signals;
    data signal detecting means connected to said tuner means and responsive to said video intermediate frequency signals for detecting said data signals;
    descrambling means connected to tuner means and responsive to said data signals for descrambling said video signals; and
    unmasking means connected to said descrambling means and responsive to said data signals for unmasking audio signals.

33. The converter recited in claim 32 further comprising detector means connected to receive said video signals and generate said data signals as a sequence of binary "1s" and "0s", said data signals being supplied to said control means.

34. The converter recited in claim 33 wherein said control means includes a microprocessor and a gate array, said microprocessor responding to data signals addressing said converter to store information conveyed by said data signals for descrambling said video signals and for unmasking said audio signals, said microprocessor using said information to control said descrambling means and said unmasking means through said gate array.

35. The converter recited in claim 34 wherein said video signals are scrambled in a plurality of modes which can be dynamically changed, said data signals conveying information for descrambling said video signals on a dynamic basis.

36. The converter recited in claim 35 wherein said descrambling means is a variable attenuator and wherein said unmasking means is a phase shifter.

37. A phase modulator for a television transmitter, said phase modulator being used to mask the audio in a television signal and comprising:
    means for generating data signals as a sequence of binary "1s" and "0s";
    means for phase modulating a video carrier of said television transmitter with said data signals during a horizontal blanking period, wherein said means for phase modulating the video carrier produces two or more phase changes in said video carrier during a horizontal blanking period and wherein a relative position of one of said phase changes with respect to another of said phase changes is varied to represent a binary bit of data; and
    said television transmitter transmitting the phase modulated video carrier.

38. A phase modulator for a television transmitter, said phase modulator being used to mask the audio in a television signal and comprising:
    means for generating data signals as a sequence of binary "1s" and "0s";
    means for phase modulating a video carrier of said television transmitter with said data signals during a horizontal blanking period, wherein the phase changes representing binary "1s" and "0s" differ in magnitude and wherein said means for phase modulating the video carrier produces two or more phase changes in said video carrier during a horizontal blanking period, each of said phase changes representing a binary bit of data, and wherein a relative position of one of said phase changes with respect to another of said phase changes is varied to represent a binary bit of data; and
    said television transmitter transmitting the phase modulated video carrier.

39. A phase modulator for a television transmitter, said phase modulator being used to mask the audio in a television signal and comprising:
    means for generating data signals as a sequence of binary "1s" and "0s";
    means for phase modulating a video carrier of said television transmitter with said data signals during a horizontal blanking period, wherein the phase changes representing binary "1s" and "0s" differ in polarity; and
    said television transmitter transmitting the phase modulated video carrier.

40. The phase modulator recited in claim 39 wherein said means for phase modulating the video carrier produces two or more phase changes in said video carrier during a horizontal blanking period, each of said phase changes representing a binary bit of data, and wherein a relative position of one of said phase changes with respect to another of said phase changes is varied to represent a binary bit of data.

* * * * *